(12) United States Patent
Soeda et al.

(10) Patent No.: US 12,460,015 B2
(45) Date of Patent: Nov. 4, 2025

(54) PHARMACEUTICAL FORMULATION COMPRISING AQUEOUS SOLUTION OF ANTIBODY

(71) Applicants: Chugai Seiyaku Kabushiki Kaisha, Tokyo (JP); Hoffmann-La Roche Inc., Little Falls, NJ (US)

(72) Inventors: Kohei Soeda, Tokyo (JP); Masakazu Fukuda, Tokyo (JP); Masaya Takahashi, Tokyo (JP); Hirotaka Imai, Tokyo (JP); Satoshi Saitoh, Tokyo (JP); Jeremy Duboeuf, Basel (CH); Kishore Ravuri, Basel (CH); Robert Kopf, Basel (CH); Wei Chen, Basel (CH); Nuria Sancho Oltra, Basel (CH)

(73) Assignees: Chugai Seiyaku Kabushiki Kaisha, Tokyo (JP); Hoffmann-La Roche Inc., Little Falls, NJ (US)

( * ) Notice: Subject to any disclaimer, the term of this patent is extended or adjusted under 35 U.S.C. 154(b) by 0 days.

(21) Appl. No.: 18/715,020

(22) PCT Filed: Dec. 1, 2022

(86) PCT No.: PCT/JP2022/044355
§ 371 (c)(1),
(2) Date: May 30, 2024

(87) PCT Pub. No.: WO2023/100975
PCT Pub. Date: Jun. 8, 2023

(65) Prior Publication Data
US 2025/0136716 A1    May 1, 2025

(30) Foreign Application Priority Data
Dec. 1, 2021 (JP) .................. 2021-195788

(51) Int. Cl.
C07K 16/36  (2006.01)
A61K 39/00  (2006.01)
C07K 16/28  (2006.01)

(52) U.S. Cl.
CPC .......... *C07K 16/36* (2013.01); *A61K 39/0005* (2013.01); *C07K 16/2866* (2013.01); *C07K 2317/24* (2013.01); *C07K 2317/31* (2013.01)

(58) Field of Classification Search
None
See application file for complete search history.

(56) References Cited

U.S. PATENT DOCUMENTS

| | | | | |
|---|---|---|---|---|
| 9,334,331 | B2 * | 5/2016 | Igawa | .................. A61P 7/00 |
| 10,450,381 | B2 * | 10/2019 | Igawa | .................. A61P 7/04 |
| 2006/0159653 | A1 | 7/2006 | Saito et al. | |
| 2008/0190179 | A1 | 8/2008 | Rossi | |
| 2013/0274421 | A1 | 10/2013 | Kim et al. | |
| 2018/0148509 | A1 | 5/2018 | Kakehi et al. | |
| 2019/0083618 | A1 | 3/2019 | Patel et al. | |
| 2019/0085125 | A1 | 3/2019 | Licht et al. | |
| 2021/0189006 | A1 * | 6/2021 | Saeki | .................. A61P 7/04 |
| 2023/0210991 | A1 * | 7/2023 | Kameoka | .................. A61K 9/19 |
| | | | | 424/133.1 |

FOREIGN PATENT DOCUMENTS

| | | | |
|---|---|---|---|
| JP | 2009-508132 A | 2/2009 | |
| JP | 2010-215664 A | 9/2010 | |
| JP | 2014-502656 A | 2/2014 | |
| JP | 2017-523828 A | 8/2017 | |
| JP | 2019-511606 A | 4/2019 | |
| JP | 2020-534260 A | 11/2020 | |
| KR | 2018-0095740 A | 8/2018 | |
| KR | 2019-0044673 A | 4/2019 | |
| WO | WO 2004/075913 A1 | 9/2004 | |
| WO | WO 2016/001926 A1 | 1/2016 | |
| WO | WO-2017188356 A1 * | 11/2017 | .......... A61K 39/395 |
| WO | WO 2018/047813 A1 | 3/2018 | |
| WO | WO-2021241720 A1 * | 12/2021 | .......... A61K 39/395 |

OTHER PUBLICATIONS

Chen et al., "The development and qualification of liquid adsorption chromatography for poloxamer 188 characterization," J Chromatogr A, Aug. 30, 2021, 1652:462353, 9 pages.
Examination Result Report for Enspryng® Syringes for Subcutaneous Injection 120 mg, 2020, retrieved from the internet on Dec. 21, 2022, at https://www.pmda.go.jp/drugs/2020/20200710002_30200AMX0048_A100_1.pdf, 71 pages (with partial English translation).
Grapentin et al., "Protein-Polydimethylsiloxane Particles in Liquid Vial Monoclonal Antibody Formulations Containing Poloxamer 188," J Pharm Sci, Aug. 2020, 109(8):2393-2404.
Medication Guide for Hemlibra®, 2017, retrieved from the internet on Dec. 19, 2022 at https://accessdata.fda.gov/drugsatfda_docs/label/2017/761083s0001bl.pdf, 16 pages.
Melchore, "Sound Practices for Consistent Human Visual Inspection," AAPS PharmSciTech, Mar. 2011, 12(1):215-221.

(Continued)

*Primary Examiner* — Michael Szperka
(74) *Attorney, Agent, or Firm* — Fish & Richardson P.C.

(57) ABSTRACT

Provided is a pharmaceutical formulation with reduced particle formation, comprising an anti-coagulation factor IXa/X antibody (bispecific monoclonal antibody) that substitutes for coagulation factor VIII, or an anti-IL-6 receptor antibody that inhibits binding to the interleukin 6 receptor. Provided is a pharmaceutical formulation comprising an aqueous solution comprising a polyoxyethylene polyoxypropylene glycol (poloxamer),
wherein the poloxamer is represented by formula I:

$$HO(C_2H_4O)_a(C_3H_6O)_b(C_2H_4O)_cH \qquad (I)$$

wherein a and c are independently an integer selected from 75 to 85;
b is an integer selected from 22 to 33; and
a, b and c are average values over the entire poloxamer, and,
the poloxamer comprises poloxamer molecules comprising 34 or more ($C_3H_6O$) in the molecule at a ratio of 3% (w/w) or more of the total poloxamer.

11 Claims, 8 Drawing Sheets
Specification includes a Sequence Listing.

(56) References Cited

OTHER PUBLICATIONS

Peng et al., "Mechanism Investigation for Poloxamer 188 Raw Material Variation in Cell Culture," American Institute of Chemical Engineers Biotechnol Prog, May 2016, 32(3):767-775.

Soeda et al., "Impact of Poloxamer 188 Material Attributes on Proteinaceous Visible Particle Formation in Liquid Monoclonal Antibody Formulations," Journal of Pharmaceutical Sciences, Aug. 2022, 111(8):2191-2200.

Vaclaw et al., "Impact of Polysorbate 80 Grade on the Interfacial Properties and Interfacial Stress Induced Subvisible Particle Formation in Monoclonal Antibodies," J Pharm Sci, Feb. 2021, 110(2):746-759.

English translation of International Search Report in PCT/JP2022/044355, mailed Mar. 7, 2023, 3 pages.

* cited by examiner

PHARMACEUTICAL FORMULATION COMPRISING AQUEOUS SOLUTION OF ANTIBODY

CROSS-REFERENCE TO RELATED APPLICATIONS

This application is the National Stage of International Application No. PCT/JP2022/044355, filed on Dec. 1, 2022, which claims the benefit of Japanese Application No. 2021-195788, filed on Dec. 1, 2021. The contents of PCT/JP2022/044355 are hereby incorporated by reference in their entirety.

SEQUENCE LISTING

This application contains a Sequence Listing that has been submitted electronically as an XML file named 58270-0002US1_SequenceListing.xml. The XML file, created on May 29, 2024, is 9,020 bytes in size. The material in the XML file is hereby incorporated by reference in its entirety.

TECHNICAL FIELD

The present invention relates to a stable pharmaceutical formulation containing an antibody.

BACKGROUND ART

In recent years, various antibody formulations have been developed and put into practical use, but the formation of particles in aqueous solutions is a problem in antibody-containing formulations. As the particles that are formed, aggregates derived from the antibodies are known, including sub-visible particles (SVP), which are fine particles with diameters of 1.5 µm to less than 50 µm, generally considered difficult to see with the eye, and visible particles (VP, larger than 100 µm), which can be visually detected at standard illuminance (about 2,000 to 3,000 1×). The visual detection rate of visible particles in pharmaceutical formulations varies greatly among practitioners, but it has been reported that the detection sensitivity of particles with a diameter of 100 µm is about 40%, the detection sensitivity of particles with a diameter of 150 µm is about 70%, and the detection sensitivity of particles with a diameter of 200 µm is almost 100% at the standard illuminance (about 2,000 to 3,000 1×) specified in the Pharmacopoeia (Non Patent Literature 1). It is also possible to visually detect particles with an even smaller diameter, actually as small as 40 µm, by increasing the illuminance at which the pharmaceutical formulation is observed and lengthening the observation time.

The use of surfactants is known to reduce particle formation. Examples of such surfactants include nonionic surfactants containing poloxamers such as poloxamer 188 (PX188) and polysorbates such as polysorbate 20 and polysorbate 80. However, the ability to reduce particle formation varies depending on the type and grade of the surfactant (Non Patent Literatures 2 to 4 and Patent Literature 1). It is also known that even with surfactants of the same type, the structures of the polymers they contain are heterogeneous. Poloxamer 188 is known to vary from lot to lot, and methods to provide more homogeneous poloxamer 188 are being studied (Non Patent Literature 2 and Patent Literatures 2 to 5). It has also been reported that differences in hydrophobicity resulting from surfactant heterogeneity may affect particle formation (Non Patent Literature 2).

CITATION LIST

Patent Literature

[Patent Literature 1] Japanese Translation of PCT International Application Publication No. 2020-534260
[Patent Literature 2] Japanese Translation of PCT International Application Publication No. 2017-523828
[Patent Literature 3] Japanese Translation of PCT International Application Publication No. 2019-511606
[Patent Literature 4] Japanese Translation of PCT International Application Publication No. 2009-508132
[Patent Literature 5] Japanese Translation of PCT International Application Publication No. 2014-502656

Non Patent Literature

[Non Patent Literature 1] James A. Melchore, AAPS PharmSciTech; 2011; 12(1): 215-221.
[Non Patent Literature 2] Chen et al., J. Chromatogr. A 1652 (2021) 462353.
[Non Patent Literature 3] Grapentin et al., J. Pharm. Sci. 109 (2020) 2393-2404.
[Non Patent Literature 4] Vaclaw et al., J. Pharm. Sci. 110 (2021) 746-759.

SUMMARY OF INVENTION

Technical Problem

It was not known what degree of hydrophobicity of the surfactant would reduce particle formation in anti-coagulation factor IXa/X antibodies (bispecific monoclonal antibodies) that substitute for coagulation factor VIII, or in anti-IL-6 receptor antibodies that inhibit binding to the interleukin 6 receptor. In addition, the effects of the surface tension of the solution containing the surfactant and of the impurities contained in the surfactant (e.g., unreacted intermediate compounds with unsaturated bonds) on particle formation were not known. There is a need for better surfactants to control particle formation.

Solution to Problem

The present inventors have found that the addition of a surfactant such as a poloxamer, which contains components with long polypropylene oxide blocks and high hydrophobicity, is effective in reducing particle formation in pharmaceutical formulations containing specific antibodies. Specifically, the disclosure of the following invention is encompassed herein.

[1-1]A pharmaceutical formulation, comprising an aqueous solution comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, and polyoxyethylene polyoxypropylene glycol (poloxamer), wherein the poloxamer is represented by formula I:

$$HO(C_2H_4O)_a(C_3H_6O)_b(C_2H_4O)_cH \quad (I)$$

wherein a and c are independently a number selected from 75 to 85;

b is a number selected from 22 to 40; and a, b and c are average values over the entire poloxamer, and, the peak area after an elution time of 17 minutes is 3% or more of the total peak area in high performance liquid chromatography under the conditions defined below:

[High-Performance Liquid Chromatography Conditions]
(1) Column: HPLC column packed with macroporous styrene divinylbenzene (1000 Å, 5 μm, 50×2.1 mm)
(2) Mobile phase:
  Mobile phase A: Ultrapure water
  Mobile phase B: Acetonitrile
(3) Elution gradient program
  From 0 minute to 16.0 minutes: Mobile phase B 58% to 64%
  From 16.0 minutes to 18.5 minutes: Mobile phase B 64% to 90%
  From 18.5 minutes to 21.5 minutes: Mobile phase B fixed at 90%
  From 21.5 minutes to 23.5 minutes: Mobile phase B 90% to 100%
  From 23.5 minutes to 30.0 minutes: Mobile phase B fixed at 100%
  From 30.0 minutes to 30.1 minutes: Mobile phase B 100% to 58%
  From 30.1 minutes to 40.0 minutes: Mobile phase B fixed at 58%
(4) Flow rate: 0.2 mL/min
(5) Detection method: Evaporative light scattering detection (drift tube temperature: 50±25° C., nebulizer heating power level: 75%, gain value: 250, gas pressure: 20 psi)
(6) Column temperature: 65±5° C.
(7) Poloxamer concentration (in ultrapure water): 0.5 mg/mL.

[1-2] The pharmaceutical formulation according to [1-1], wherein b is a number selected from 22 to 33.

[1-3] The pharmaceutical formulation according to [1-1], wherein b is a number selected from 25 to 30.

[1-4] The pharmaceutical formulation according to [1-1], wherein b is a number selected from 35 to 40.

[1-5] The pharmaceutical formulation according to any one of [1-1] to [1-4], wherein the peak area after 17 minutes is 6% or more, 19% or more, 33% or more, or 35% or more.

[1-6] A pharmaceutical formulation, comprising an aqueous solution comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, and polyoxyethylene polyoxypropylene glycol (poloxamer),
  wherein the poloxamer is represented by formula I:

$$HO(C_2H_4O)_a(C_3H_6O)_b(C_2H_4O)_cH \qquad (I)$$

wherein a and c are independently a number selected from 75 to 85;
  b is a number selected from 22 to 40; and
  a, b and c are average values over the entire poloxamer, and,
  the peak area after an elution time of 17 minutes is 3% or more of the total peak area after 1.5 minutes in high performance liquid chromatography under the conditions defined below:

[High-Performance Liquid Chromatography Conditions]
(1) Column: HPLC column packed with macroporous styrene divinylbenzene (1000 Å, 5 μm, 50×2.1 mm)
(2) Mobile phase:
  Mobile phase A: Ultrapure water
  Mobile phase B: Acetonitrile
(3) Elution gradient program
  From 0 minute to 16.0 minutes: Mobile phase B 58% to 64%
  From 16.0 minutes to 18.5 minutes: Mobile phase B 64% to 90%
  From 18.5 minutes to 21.5 minutes: Mobile phase B fixed at 90%
  From 21.5 minutes to 23.5 minutes: Mobile phase B 90% to 100%
  From 23.5 minutes to 30.0 minutes: Mobile phase B fixed at 100%
  From 30.0 minutes to 30.1 minutes: Mobile phase B 100% to 58%
  From 30.1 minutes to 40.0 minutes: Mobile phase B fixed at 58%
(4) Flow rate: 0.2 mL/min
(5) Detection method: Evaporative light scattering detection (drift tube temperature: 50±25° C., nebulizer heating power level: 75%, gain value: 250, gas pressure: 20 psi)
(6) Column temperature: 65±5° C.
(7) Poloxamer concentration (in ultrapure water): 0.5 mg/mL.

[1-7] The pharmaceutical formulation according to [1-6], wherein b is a number selected from 22 to 33.

[1-8] The pharmaceutical formulation according to [1-6], wherein b is a number selected from 25 to 30.

[1-9] The pharmaceutical formulation according to [1-6], wherein b is a number selected from 35 to 40.

[1-10] The pharmaceutical formulation according to any one of [1-6] to [1-9], wherein the peak area after 17 minutes is 6% or more, 20% or more, 36% or more, or 46% or more.

[1-11] The pharmaceutical formulation according to any one of [1-1] to [1-10], wherein the HPLC column packed with macroporous styrene divinylbenzene is a PLRP-S column.

[1-12] A pharmaceutical formulation, comprising an aqueous solution comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, and polyoxyethylene polyoxypropylene glycol (poloxamer),
  wherein the poloxamer is represented by formula I:

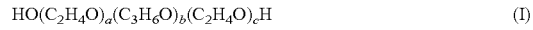

$$HO(C_2H_4O)_a(C_3H_6O)_b(C_2H_4O)_cH \qquad (I)$$

wherein a and c are independently a number selected from 75 to 85;
  b is a number selected from 22 to 40; and
  a, b and c are average values over the entire poloxamer, and,
  the poloxamer comprises poloxamer molecules comprising 34 or more ($C_3H_6O$) in the molecule at a ratio of 3% (w/w) or more of the total poloxamer.

[1-13] The pharmaceutical formulation according to [1-12], wherein b is a number selected from 22 to 33.

[1-14] The pharmaceutical formulation according to [1-12], wherein b is a number selected from 25 to 30.

[1-15] The pharmaceutical formulation according to [1-12], wherein b is a number selected from 35 to 40.

[1-16] The pharmaceutical formulation according to any one of [1-12] to [1-15], comprising poloxamer molecules comprising 34 or more ($C_3H_6O$) in the molecule at a ratio of 6%, 20%, 29%, or 36% (w/w) or more of the total poloxamer.

[1-17] The pharmaceutical formulation according to any one of [1-1] to [1-16], wherein the number-average molecular weight of the poloxamer is comprised in the range of 7680 to 9510.

[1-18] The pharmaceutical formulation according to any one of [1-1] to [1-17], wherein the concentration of the poloxamer in the aqueous solution is 0.001 to 100 mg/mL, 0.01 to 10 mg/mL, 0.05 to 5 mg/mL, or 0.1 to 1 mg/mL.

[1-19] The pharmaceutical formulation according to any one of [1-1] to [1-18], wherein the concentration of the antibody in the aqueous solution is 10 to 300 mg/mL, 20 to 200 mg/mL, or 30 to 150 mg/mL.

[1-20] The pharmaceutical formulation according to any one of [1-1] to [1-19], wherein the aqueous solution comprises one or more pharmaceutically acceptable excipients selected from sugars, sugar alcohols, buffering agents, preservatives, carriers, antioxidants, chelating agents, natural polymers, synthetic polymers, cryoprotectants, extenders, and stabilizers.

[1-21] The pharmaceutical formulation according to any one of [1-1] to [1-20], wherein the poloxamer is poloxamer 188 or poloxamer 237.

[2-1] A pharmaceutical formulation, comprising an aqueous solution comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, and a surfactant,
wherein the surfactant is a surfactant in which an aqueous solution comprising the surfactant at a concentration of 0.5 mg/mL has a surface tension of 52.3 mN/m or less.

[2-2] The pharmaceutical formulation according to [2-1], wherein the surfactant is a surfactant in which an aqueous solution comprising the surfactant at a concentration of 0.5 mg/mL has a surface tension of 52 mN/m or less, 51 mN/m or less, 50.7 mN/m or less, 50.5 mN/m or less, or 39 mN/m or less.

[2-3] The pharmaceutical formulation according to [2-1] or [2-2], wherein the surfactant is selected from poloxamer or fatty acid polyoxyethylene sorbitan (polysorbate).

[2-4] The pharmaceutical formulation according to any one of [2-1] to [2-3], wherein the surfactant is a poloxamer represented by formula I according to any one of [1-1] to [1-4] or [1-21].

[2-5] The pharmaceutical formulation according to [2-3], wherein the poloxamer is poloxamer 188 or poloxamer 237.

[2-6] The pharmaceutical formulation according to [2-4] or [2-5], wherein the number-average molecular weight of the poloxamer is comprised in the range of 7680 to 9510.

[2-7] The pharmaceutical formulation according to any one of [2-1] to [2-6], wherein the surfactant is a polysorbate selected from polysorbate 20, polysorbate 60, polysorbate 65, or polysorbate 80.

[2-8] The pharmaceutical formulation according to any one of [2-1] to [2-7], wherein the surfactant is a polysorbate selected from polysorbate 20 or polysorbate 80.

[2-9] The pharmaceutical formulation according to any one of [2-1] to [2-8], wherein the surfactant is polysorbate 80.

[2-10] The pharmaceutical formulation according to any one of [2-1] to [2-9], wherein the concentration of the surfactant in the aqueous solution is 0.001 to 100 mg/mL, 0.01 to 10 mg/mL, 0.05 to 5 mg/mL, or 0.1 to 1 mg/mL.

[2-11] The pharmaceutical formulation according to any one of [2-1] to [2-10], wherein the concentration of the antibody in the aqueous solution is 10 to 300 mg/mL, 20 to 200 mg/mL, or 30 to 150 mg/mL.

[2-12] The pharmaceutical formulation according to any one of [2-1] to [2-11], wherein the aqueous solution comprises one or more pharmaceutically acceptable excipients selected from sugars, sugar alcohols, buffering agents, preservatives, carriers, antioxidants, chelating agents, natural polymers, synthetic polymers, cryoprotectants, extenders, and stabilizers.

[3-1] A pharmaceutical formulation, comprising an aqueous solution comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, and polyoxyethylene polyoxypropylene glycol (poloxamer),
wherein the poloxamer is represented by formula I:

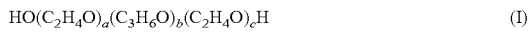
$$HO(C_2H_4O)_a(C_3H_6O)_b(C_2H_4O)_cH \qquad (I)$$

wherein a and c are independently a number selected from 75 to 85;
b is a number selected from 22 to 40; and
a, b and c are average values over the entire poloxamer, and,
the degree of unsaturation of the poloxamer is less than 0.018 mEq/g.

[3-2] The pharmaceutical formulation according to [3-1], wherein b is a number selected from 22 to 33.

[3-3] The pharmaceutical formulation according to [3-1], wherein b is a number selected from 25 to 30.

[3-4] The pharmaceutical formulation according to [3-1], wherein b is a number selected from 35 to 40.

[3-5] The pharmaceutical formulation according to any one of [3-1] to [3-4], wherein the number-average molecular weight of the poloxamer is comprised in the range of 7680 to 9510.

[3-6] The pharmaceutical formulation according to any one of [3-1] to [3-5], wherein the concentration of the poloxamer in the aqueous solution is 0.001 to 100 mg/mL, 0.01 to 10 mg/mL, 0.05 to 5 mg/mL, or 0.1 to 1 mg/mL.

[3-7] The pharmaceutical formulation according to any one of [3-1] to [3-6], wherein the concentration of the antibody in the aqueous solution is 10 to 300 mg/mL, 20 to 200 mg/mL, or 30 to 150 mg/mL.

[3-8] The pharmaceutical formulation according to any one of [3-1] to [3-7], wherein the aqueous solution comprises one or more pharmaceutically acceptable excipients selected from sugars, sugar alcohols, buffering agents, preservatives, carriers, antioxidants, chelating agents, natural polymers, synthetic polymers, cryoprotectants, extenders, and stabilizers.

[3-9] The pharmaceutical formulation according to any one of [3-1] to [3-8], wherein the poloxamer is poloxamer 188 or poloxamer 237.

[4-1] A method for reducing the formation of particles in an aqueous solution, in a pharmaceutical formulation comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, in an aqueous solution,
comprising adding a polyoxyethylene polyoxypropylene glycol (poloxamer) in the aqueous solution,
wherein the poloxamer is represented by formula I:

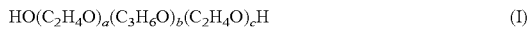
$$HO(C_2H_4O)_a(C_3H_6O)_b(C_2H_4O)_cH \qquad (I)$$

wherein a and c are independently a number selected from 75 to 85;
b is a number selected from 22 to 40; and
a, b and c are average values over the entire poloxamer, and, the peak area after an elution time of 17 minutes is 3% or more of the total peak area in high performance liquid chromatography under the conditions defined below:

[High-Performance Liquid Chromatography Conditions]
(1) Column: HPLC column packed with macroporous styrene divinylbenzene (1000 Å, 5 μm, 50×2.1 mm)
(2) Mobile phase:
Mobile phase A: Ultrapure water
Mobile phase B: Acetonitrile
(3) Elution gradient program
From 0 minute to 16.0 minutes: Mobile phase B 58% to 64%
From 16.0 minutes to 18.5 minutes: Mobile phase B 64% to 90%
From 18.5 minutes to 21.5 minutes: Mobile phase B fixed at 90%
From 21.5 minutes to 23.5 minutes: Mobile phase B 90% to 100%
From 23.5 minutes to 30.0 minutes: Mobile phase B fixed at 100%
From 30.0 minutes to 30.1 minutes: Mobile phase B 100% to 58%
From 30.1 minutes to 40.0 minutes: Mobile phase B fixed at 5800
(4) Flow rate: 0.2 mL/min
(5) Detection method: Evaporative light scattering detection (drift tube temperature: 50±25° C., nebulizer heating power level: 75%, gain value: 250, gas pressure: 20 psi)
(6) Column temperature: 65±5° C.
(7) Poloxamer concentration (in ultrapure water): 0.5 mg/mL.

[4-2] A method for reducing the formation of particles in an aqueous solution, in a pharmaceutical formulation comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, in an aqueous solution,
comprising adding a polyoxyethylene polyoxypropylene glycol (poloxamer) in the aqueous solution,
wherein the poloxamer is represented by formula I:

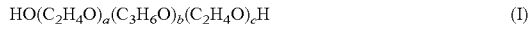

wherein a and c are independently a number selected from 75 to 85;
b is a number selected from 22 to 40; and
a, b and c are average values over the entire poloxamer, and, the peak area after an elution time of 17 minutes is 3% or more of the total peak area after 1.5 minutes in high performance liquid chromatography under the conditions defined below:

[High-Performance Liquid Chromatography Conditions]
(1) Column: HPLC column packed with macroporous styrene divinylbenzene (1000 Å, 5 μm, 50×2.1 mm)
(2) Mobile phase:
Mobile phase A: Ultrapure water
Mobile phase B: Acetonitrile
(3) Elution gradient program
From 0 minute to 16.0 minutes: Mobile phase B 58% to 64%
From 16.0 minutes to 18.5 minutes: Mobile phase B 64% to 90%
From 18.5 minutes to 21.5 minutes: Mobile phase B fixed at 90%
From 21.5 minutes to 23.5 minutes: Mobile phase B 90% to 100%
From 23.5 minutes to 30.0 minutes: Mobile phase B fixed at 100%
From 30.0 minutes to 30.1 minutes: Mobile phase B 100% to 58%
From 30.1 minutes to 40.0 minutes: Mobile phase B fixed at 58%
(4) Flow rate: 0.2 mL/min
(5) Detection method: Evaporative light scattering detection (drift tube temperature: 50±25° C., nebulizer heating power level: 75%, gain value: 250, gas pressure: 20 psi)
(6) Column temperature: 65±5° C.
(7) Poloxamer concentration (in ultrapure water): 0.5 mg/mL.

[4-3] The method according to [4-1] or [4-2], wherein the HPLC column packed with macroporous styrene divinylbenzene is a PLRP-S column.

[4-4] A method for reducing the formation of particles in an aqueous solution, in a pharmaceutical formulation comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, in an aqueous solution,
comprising adding a polyoxyethylene polyoxypropylene glycol (poloxamer) in the aqueous solution,
wherein the poloxamer is represented by formula I:

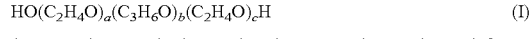

wherein a and c are independently a number selected from 75 to 85;
b is a number selected from 22 to 40; and
a, b and c are average values over the entire poloxamer, and, the poloxamer comprises poloxamer molecules comprising 34 or more ($C_3H_6O$) in the molecule at a ratio of 3% (w/w) or more of the total poloxamer.

[4-5] The method according to any one of [4-1] to [4-4], wherein b is a number selected from 22 to 33.
[4-6] The method according to any one of [4-1] to [4-4], wherein b is a number selected from 25 to 30.
[4-7] The method according to any one of [4-1] to [4-4], wherein b is a number selected from 35 to 40.
[4-8] The method according to any one of [4-1] to [4-7], wherein the poloxamer is poloxamer 188 or poloxamer 237.
[4-9] A method for reducing the formation of particles in an aqueous solution, in a pharmaceutical formulation comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, in an aqueous solution,
comprising adding in an aqueous solution a surfactant having a surface tension of 52.3 mN/m or less in the aqueous solution of the surfactant at a concentration of 0.5 mg/mL.
[4-10] The method according to [4-9], wherein the surfactant is selected from poloxamer or fatty acid polyoxyethylene sorbitan (polysorbate).
[4-11] The method according to [4-9] or [4-10], wherein the surfactant is a poloxamer represented by formula I according to any of [1-1] to [1-4] or [1-21].
[4-12] The method according to [4-11], wherein the number-average molecular weight of the poloxamer is comprised in the range of 7680 to 9510.

[4-13] The method according to any one of [4-9] to [4-12], wherein the surfactant is a polysorbate selected from polysorbate 20, polysorbate 60, polysorbate 65, or polysorbate 80.

[4-14] The method according to any one of [4-9] to [4-13], wherein the surfactant is a polysorbate selected from polysorbate 20 or polysorbate 80.

[4-15] The method according to any one of [4-9] to [4-14], wherein the surfactant is polysorbate 80.

[4-16] The method according to any one of [4-1] to [4-15], wherein the surfactant is added at a concentration of 0.001 to 100 mg/mL, 0.01 to 10 mg/mL, 0.05 to 5 mg/mL, or 0.1 to 1 mg/mL in the aqueous solution.

[4-17] The method according to any one of [4-1] to [4-16], wherein the concentration of the antibody in the aqueous solution is 10 to 300 mg/mL, 20 to 200 mg/mL, or 30 to 150 mg/mL.

[4-18] The method according to any one of [4-1] to [4-17], wherein the aqueous solution comprises one or more pharmaceutically acceptable excipients selected from sugars, sugar alcohols, buffering agents, preservatives, carriers, antioxidants, chelating agents, natural polymers, synthetic polymers, cryoprotectants, extenders, and stabilizers.

[4-19] The method according to any one of [4-1] to [4-18], wherein the particle is derived from a protein.

[4-20] The method according to any one of [4-1] to [4-19], wherein the particle has a diameter of 40 μm or more.

[5-1] A pharmaceutical formulation, comprising an aqueous solution comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, and polyoxyethylene polyoxypropylene glycol (poloxamer),
wherein the number-average molecular weight of the poloxamer is comprised in the range of 7680 to 9510.

[5-2] The pharmaceutical formulation according to [5-1], wherein the poloxamer is represented by formula I:

$$HO(C_2H_4O)_a(C_3H_6O)_b(C_2H_4O)_cH \qquad (I)$$

wherein a and c are independently a number selected from 60 to 85;

b is a number selected from 22 to 40; and a, b and c are average values over the entire poloxamer.

[5-3] The pharmaceutical formulation according to [5-2], wherein a and c are independently a number selected from 60 to 68.

[5-4] The pharmaceutical formulation according to [5-3], wherein b is a number selected from 22 to 33.

[5-5] The pharmaceutical formulation according to [5-3], wherein b is a number selected from 25 to 30.

[5-6] The pharmaceutical formulation according to [5-3], wherein b is a number selected from 35 to 40.

[5-7] The pharmaceutical formulation according to [5-2], wherein a and c are independently a number selected from 75 to 85.

[5-8] The pharmaceutical formulation according to [5-7], wherein b is a number selected from 22 to 33.

[5-9] The pharmaceutical formulation according to [5-7], wherein b is a number selected from 25 to 30.

[5-10] The pharmaceutical formulation according to [5-7], wherein b is a number selected from 35 to 40.

[5-11] The pharmaceutical formulation according to [5-2], wherein a and c are independently a number selected from 75 to 85, and b is a number selected from 25 to 30.

[5-12] The pharmaceutical formulation according to [5-2], wherein a and c are independently a number selected from 60 to 68, and b is a number selected from 35 to 40.

[5-13] The pharmaceutical formulation according to any one of [5-1] to [5-12], wherein the peak area after an elution time of 17 minutes is 3% or more of the total peak area after 1.5 minutes in high performance liquid chromatography under the conditions defined below:

[High-Performance Liquid Chromatography Conditions]
(1) Column: HPLC column packed with macroporous styrene divinylbenzene (1000 Å, 5 μm, 50×2.1 mm)
(2) Mobile phase:
  Mobile phase A: Ultrapure water
  Mobile phase B: Acetonitrile
(3) Elution gradient program
  From 0 minute to 16.0 minutes: Mobile phase B 58% to 64%
  From 16.0 minutes to 18.5 minutes: Mobile phase B 64% to 90%
  From 18.5 minutes to 21.5 minutes: Mobile phase B fixed at 90%
  From 21.5 minutes to 23.5 minutes: Mobile phase B 90% to 100%
  From 23.5 minutes to 30.0 minutes: Mobile phase B fixed at 100%
  From 30.0 minutes to 30.1 minutes: Mobile phase B 100% to 58%
  From 30.1 minutes to 40.0 minutes: Mobile phase B fixed at 58%
(4) Flow rate: 0.2 mL/min
(5) Detection method: Evaporative light scattering detection (drift tube temperature: 50±25° C., nebulizer heating power level: 75%, gain value: 250, gas pressure: 20 psi)
(6) Column temperature: 65±5° C.
(7) Poloxamer concentration (in ultrapure water): 0.5 mg/mL.

[5-14] The pharmaceutical formulation according to [5-13], wherein the peak area after an elution time of 17 minutes is 3% or more of the total peak area in high performance liquid chromatography.

[5-15] The pharmaceutical formulation according to [5-13] or [5-14], wherein the peak area after 17 minutes is 6% or more, 19% or more, 20% or more, 33% or more, 35% or more, 36% or more, or 46% or more.

[5-16] The pharmaceutical formulation according to any one of [5-13] to [5-15], wherein the HPLC column packed with macroporous styrene divinylbenzene is a PLRP-S column.

[5-17] The pharmaceutical formulation according to any one of [5-1] to [5-16], wherein the poloxamer comprises poloxamer molecules comprising 34 or more ($C_3H_6O$) in the molecule at a ratio of 3% (w/w) or more of the total poloxamer.

[5-18] The pharmaceutical formulation according to any one of [5-1] to [5-17], wherein the poloxamer comprises poloxamer molecules comprising 34 or more ($C_3H_6O$) in the molecule at a ratio of 6%, 20%, 29%, or 36% (w/w) or more of the total poloxamer.

[5-19] The pharmaceutical formulation according to any one of [5-1] to [5-18], wherein the degree of unsaturation of the poloxamer is less than 0.018 mEq/g.

[5-20] The pharmaceutical formulation according to any one of [5-1] to [5-19], wherein the number-average molecular weight of the poloxamer is comprised in the range of 6840 to 8830.

[5-21] The pharmaceutical formulation according to any one of [5-1] to [5-20], wherein the concentration of the poloxamer in the aqueous solution is 0.001 to 100 mg/mL, 0.01 to 10 mg/mL, 0.05 to 5 mg/mL, or 0.1 to 1 mg/mL.

[5-22] The pharmaceutical formulation according to any one of [5-1] to [5-21], wherein the concentration of the antibody in the aqueous solution is 10 to 300 mg/mL, 20 to 200 mg/mL, or 30 to 150 mg/mL.

[5-23] The pharmaceutical formulation according to any one of [5-1] to [5-22], wherein the aqueous solution comprises one or more pharmaceutically acceptable excipients selected from sugars, sugar alcohols, buffering agents, preservatives, carriers, antioxidants, chelating agents, natural polymers, synthetic polymers, cryoprotectants, extenders, and stabilizers.

[5-24] The pharmaceutical formulation according to any one of [5-1] to [5-23], wherein the poloxamer is poloxamer 188 or poloxamer 237.

[6-1] A method for reducing the formation of particles in an aqueous solution, in a pharmaceutical formulation comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, in an aqueous solution,
comprising adding a polyoxyethylene polyoxypropylene glycol (poloxamer) in the aqueous solution,
wherein the number-average molecular weight of the poloxamer is comprised in the range of 7680 to 9510.

[6-2] The method according to [6-1],
wherein the poloxamer is represented by formula I:

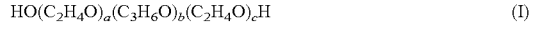

$$HO(C_2H_4O)_a(C_3H_6O)_b(C_2H_4O)_cH \qquad (I)$$

wherein a and c are independently a number selected from 60 to 85;
b is a number selected from 22 to 40; and
a, b and c are average values over the entire poloxamer.

[6-3] The method according to [6-2], wherein a and c are independently a number selected from 60 to 68.

[6-4] The method according to [6-3], wherein b is a number selected from 22 to 33.

[6-5] The method according to [6-3], wherein b is a number selected from 25 to 30.

[6-6] The method according to [6-3], wherein b is a number selected from 35 to 40.

[6-7] The method according to [6-2], wherein a and c are independently a number selected from 75 to 85.

[6-8] The method according to [6-7], wherein b is a number selected from 22 to 33.

[6-9] The method according to [6-7], wherein b is a number selected from 25 to 30.

[6-10] The method according to [6-7], wherein b is a number selected from 35 to 40.

[6-11] The method according to [6-2], wherein a and c are independently a number selected from 75 to 85, and b is a number selected from 25 to 30.

[6-12] The method according to [6-2], wherein a and c are independently a number selected from 60 to 68, and b is a number selected from 35 to 40.

[6-13] The method according to any one of [6-1 to [6-12], wherein the peak area after an elution time of 17 minutes is 3% or more of the total peak area after 1.5 minutes in high performance liquid chromatography under the conditions defined below:
[High-Performance Liquid Chromatography Conditions]
(1) Column: HPLC column packed with macroporous styrene divinylbenzene (1000 Å, 5 μm, 50×2.1 mm)
(2) Mobile phase:
Mobile phase A: Ultrapure water
Mobile phase B: Acetonitrile
(3) Elution gradient program
From 0 minute to 16.0 minutes: Mobile phase B 58% to 64%
From 16.0 minutes to 18.5 minutes: Mobile phase B 64% to 90%
From 18.5 minutes to 21.5 minutes: Mobile phase B fixed at 90%
From 21.5 minutes to 23.5 minutes: Mobile phase B 90% to 100%
From 23.5 minutes to 30.0 minutes: Mobile phase B fixed at 100%
From 30.0 minutes to 30.1 minutes: Mobile phase B 100% to 58%
From 30.1 minutes to 40.0 minutes: Mobile phase B fixed at 58%
(4) Flow rate: 0.2 mL/min
(5) Detection method: Evaporative light scattering detection (drift tube temperature: 50±25° C., nebulizer heating power level: 75%, gain value: 250, gas pressure: 20 psi)
(6) Column temperature: 65±5° C.
(7) Poloxamer concentration (in ultrapure water): 0.5 mg/mL.

[6-14] The method according to [6-13], wherein the peak area after an elution time of 17 minutes is 3% or more of the total peak area in high performance liquid chromatography.

[6-15] The method according to [6-13] or [6-14], wherein the peak area after 17 minutes is 6% or more, 19% or more, 20% or more, 33% or more, 35% or more, 36% or more, or 46% or more.

[6-16] The method according to any one of [6-13] to [6-15], wherein the HPLC column packed with macroporous styrene divinylbenzene is a PLRP-S column.

[6-17] The method according to any one of [6-1] to [6-16], wherein the poloxamer comprises poloxamer molecules comprising 34 or more ($C_3H_6O$) in the molecule at a ratio of 3% (w/w) or more of the total poloxamer.

[6-18] The method according to any one of [6-1] to [6-17], wherein the poloxamer comprises poloxamer molecules comprising 34 or more ($C_3H_6O$) in the molecule at a ratio of 6%, 20%, 29%, or 36% (w/w) or more of the total poloxamer.

[6-19] The method according to any one of [6-1] to [6-18], wherein the degree of unsaturation of the poloxamer is less than 0.018 mEq/g.

[6-20] The method according to any one of [6-1] to [6-19], wherein the number-average molecular weight of the poloxamer is comprised in the range of 6840 to 8830.

[6-21] The method according to any one of [6-1] to [6-20], wherein the poloxamer is poloxamer 188 or poloxamer 237.

[6-22] A method for reducing the formation of particles in an aqueous solution, in a pharmaceutical formulation comprising a monoclonal antibody selected from an antibody having the H chains of SEQ ID NOs: 1 and 2 and the L chain of SEQ ID NO: 3, and an antibody having the H chain of SEQ ID NO: 4 and the L chain of SEQ ID NO: 5, in an aqueous solution,
comprising adding in an aqueous solution a surfactant having a surface tension of 52.3 mN/m or less in an aqueous solution of the surfactant at a concentration of 0.5 mg/mL.

[6-23] The method according to [6-22], wherein the surfactant is selected from poloxamer or fatty acid polyoxyethylene sorbitan (polysorbate).

[6-24] The method according to [6-22] or [6-23], wherein the surfactant is a poloxamer represented by formula I according to any one of [6-2] to [6-12] or [6-21].

[6-25] The method according to any one of [6-22] to [6-24], wherein the surfactant is a polysorbate selected from polysorbate 20, polysorbate 60, polysorbate 65, or polysorbate 80.

[6-26] The method according to any one of [6-22] to [6-25], wherein the surfactant is a polysorbate selected from polysorbate 20 or polysorbate 80.

[6-27] The method according to any one of [6-22] to [6-25], wherein the surfactant is polysorbate 80.

[6-28] The method according to any one of [6-1] to [6-27], wherein the surfactant is added at a concentration of 0.001 to 100 mg/mL, 0.01 to 10 mg/mL, 0.05 to 5 mg/mL, or 0.1 to 1 mg/mL in the aqueous solution.

[6-29] The method according to any one of [6-1] to [6-28], wherein the concentration of the antibody in the aqueous solution is 10 to 300 mg/mL, 20 to 200 mg/mL, or 30 to 150 mg/mL.

[6-30] The method according to any one of [6-1] to [6-29], wherein the aqueous solution comprises one or more pharmaceutically acceptable excipients selected from sugars, sugar alcohols, buffering agents, preservatives, carriers, antioxidants, chelating agents, natural polymers, synthetic polymers, cryoprotectants, extenders, and stabilizers.

[6-31] The method according to any one of [6-1] to [6-30], wherein the particle is derived from a protein.

[6-32] The method according to any one of [6-1] to [6-31], wherein the particle has a diameter of 40 μm or more.

Advantageous Effects of Invention

According to one aspect of the present invention, a pharmaceutical formulation with reduced particle formation, comprising an aqueous solution comprising an anti-coagulation factor IXa/X antibody (bispecific monoclonal antibody) that substitutes for coagulation factor VIII, or an anti-IL-6 receptor antibody that inhibits binding to the interleukin 6 receptor, and a surfactant is provided.

DESCRIPTION OF EMBODIMENTS

1. Antibody

Figure 1:
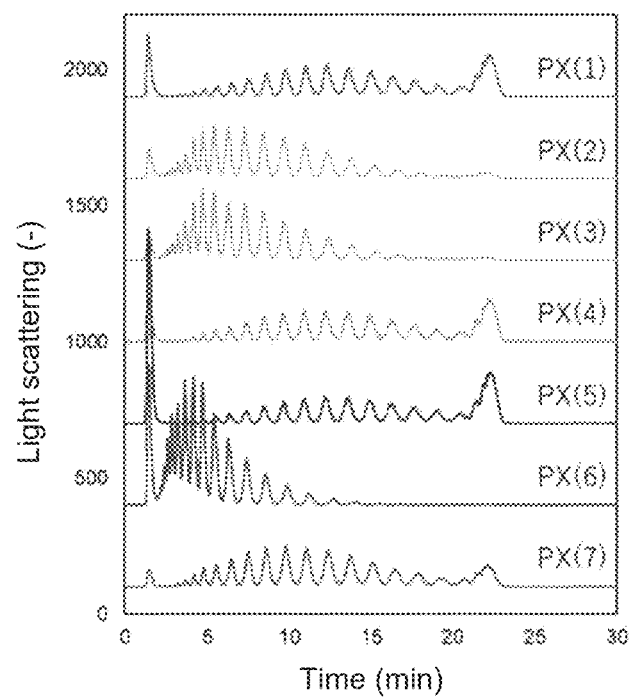
FIG. 1 is a chromatogram showing the results of analysis of the components of seven types of PX188 by reversed-phase chromatography.

In the present specification, the term "antibody" is used in the broadest sense and encompasses various antibody structures including, but not limited to, a monoclonal antibody, a polyclonal antibody, a multispecific antibody (e.g., a bispecific antibody), and an antibody fragment as long as the antibody exhibits the desired antigen-binding activity.

The "class" of an antibody refers to the type of a constant domain or a constant region carried by the heavy chain of the antibody. Antibodies have 5 major classes: IgA, IgD, IgE, IgG, and IgM. Some of these classes may be further divided into subclasses (isotypes). Examples thereof include IgG1, IgG2, IgG3, IgG4, IgA1, and IgA2. Heavy chain constant domains corresponding to immunoglobulins of different classes are called $\alpha$, $\delta$, $\epsilon$, $\gamma$, and $\mu$, respectively.

The term "monoclonal antibody" in the present specification refers to an antibody obtained from a substantially homogeneous population of antibodies. That is, the individual antibodies that compose the population are identical and/or bind to the same epitope, except for the mutant antibodies that may arise (e.g., mutant antibodies containing naturally occurring mutations, or mutant antibodies that arise during the production of monoclonal antibody preparations. Such mutants are usually present in small amounts.). In contrast to polyclonal antibody preparations, which typically contain different antibodies to different determinants (epitopes), each monoclonal antibody of a monoclonal antibody preparation is to a single determinant on an antigen. Therefore, the modifier "monoclonal" indicates the characteristic of the antibody as being obtained from a substantially homogeneous population of antibodies, and is not to be construed as requiring the production of the antibody by any specific method. For example, the monoclonal antibody used according to the present invention may be produced by various techniques, including, but not limited to, hybridoma methods, recombinant DNA methods, phage display methods, and methods utilizing transgenic animals containing all or some of the human immunoglobulin loci, and such methods and other exemplary methods for producing monoclonal antibodies are described in the present specification.

In the present specification, the term "Fc region" is used for defining the C-terminal region of immunoglobulin heavy chains, including at least a portion of constant regions. This term includes a Fc region having a natural sequence and a mutant Fc region.

The term "variable region" or "variable domain" refers to a domain of the heavy chain or light chain of an antibody, the domain involved in allowing the antibody to bind to the antigen. Usually, heavy chain and light chain variable domains (VH and VL, respectively) of a natural antibody are structurally similar and each contain 4 conserved framework regions (FRs) and 3 hypervariable regions (HVRs). (see e.g., Kindt et al., Kuby Immunology, 6th ed., W.H. Freeman and Co., page 91 (2007)). One VH or VL domain may suffice for conferring antigen binding specificity. In addition, an antibody that binds to a certain antigen may be isolated with use of the VH or VL domain from an antibody that binds to the antigen through screening of a complementary library to the VL or VH domain. For example, see Portolano et al., J. Immunol. 150:880-887 (1993); Clarkson et al., Nature 352: 624-628 (1991).

The term "framework" or "FR" refers to variable domain residues except hypervariable region (HVR) residues. FR in a variable domain normally consists of four FR domains: FR1, FR2, FR3, and FR4. According to this, HVR and FR sequences normally appear in VH (or VL) in the following order: FR1-H1(L1)-FR2-H2(L2)-FR3-H3(L3)-FR4.

The term "hypervariable region" or "HVR" used herein refers a region in the variable domain of an antibody, the region being hypervariable in its sequence ("CDR" (complementarity determining region)), and/or forming a loop definite in structure ("hypervariable loop"), and/or containing antigen-contacting residues ("antigen contacts"). Normally, an antibody comprises six HVRs: three HVRs (H1, H2 and H3) in VH and three HVRs (L1, L2 and L3) in VL.

In one aspect of the present invention, the antibody is a bispecific antibody that specifically binds to (a) coagulation factor IX (FIX) and/or activated blood coagulation factor IX (FIXa) and (b) coagulation factor X (FX) and/or activated blood coagulation factor FX (FXa), and mimics the cofactor function of coagulation factor VIII (FVIII) (e.g., emicizumab), or an anti-IL-6 receptor antibody that inhibits binding to the interleukin 6 receptor (e.g., satralizumab (SA237)).

Emicizumab is a bispecific antibody having the H chains of SEQ ID NOs: 1 and 2 and the L chain of SEQ ID NO: 3.

The anti-IL-6 receptor antibody used in the present invention binds to the IL-6 receptor, thereby inhibiting the binding of IL-6 to the IL-6 receptor and thus blocking the transmission of IL-6's biological activity into the cell. Examples of such an anti-IL-6 receptor antibody includes a monoclonal antibody having the H chain of SEQ ID NO: 4 and the L chain of SEQ ID NO: 5 (satralizumab (SA237)).

In one aspect of the present invention, the antibody is a monoclonal antibody, including chimeric, humanized, or human antibodies. In one mode, the antibody is an antibody fragment, such as an Fv, Fab, Fab', scFv, diabody, or F(ab')$_2$ fragment. In another mode, the antibody is a full-length antibody, such as complete IgG1, IgG2, IgG3, and IgG4 antibodies, or of other antibody classes or isotypes defined in the present specification.

In one aspect of the present invention, the monoclonal antibody used includes not only monoclonal antibodies derived from animals such as humans, mice, rats, hamsters, rabbits, sheep, camels, and monkeys, but also artificially altered gene recombinant antibodies such as chimeric antibodies, humanized antibodies, and bispecific antibodies. Furthermore, gene recombinant antibodies in which the constant region or the like of the antibody is artificially altered to alter the physical properties of the antibody molecule (specifically, to alter the isoelectric point (pI), the affinity of the Fc receptor, etc.) for the purpose of improving retention in blood and in vivo kinetics, are also included.

In one aspect of the present invention, the antibody used can be produced by a known method. Monoclonal antibody-producing hybridomas can be basically produced using known techniques as follows. That is, a desired antigen or a cell expressing the desired antigen is used as a sensitizing antigen to immunize cells according to a normal immunization method. The resulting immunized cells are fused with known parental cells by a normal cell fusion method. Then, monoclonal antibody-producing cells (hybridomas) are screened by a normal screening method to produce the hybridomas. Hybridomas can be produced in accordance with, for example, the method of Milstein et al. (Kohler. G. and Milstein, C., Methods Enzymol. (1981) 73: 3-46). When the immunogenicity of the antigen is low, the antigen may be conjugated to a macromolecule having immunogenicity, such as albumin, to immunize.

In addition, gene recombinant antibodies produced by cloning antibody genes from hybridomas, incorporating them into appropriate vectors, introducing them into hosts, and using a genetic recombination technique, can be used (see, for example, Carl, A. K. Borrebaeck, James, W. Larrick, THERAPEUTIC MONOCLONAL ANTIBODIES, Published in the United Kingdom by MACMILLAN PUBLISHERS LTD, 1990). Specifically, cDNA of a variable region (V region) of an antibody is synthesized from mRNA of the hybridoma using a reverse transcriptase. Once a DNA encoding the V region of an antibody of interest is obtained, it is linked to a DNA encoding a constant region (C region) of a desired antibody, and incorporated into an expression vector. Alternatively, the DNA encoding the V region of the antibody may be incorporated into an expression vector containing a DNA of an antibody C region. The DNA is incorporated into the expression vector to express under the control of an expression control region, e.g., an enhancer or a promoter. This expression vector can be used to transform a host cell to express an antibody.

In one aspect of the present invention, a gene recombinant antibody that has been artificially altered to reduce heteroantigenicity against humans or the like, such as a chimeric antibody or a humanized antibody can be used. Such altered antibodies can be produced using a known method. The chimeric antibody is an antibody consisting of a variable region of a heavy chain and a light chain of a non-human mammal antibody, such as a mouse antibody, and a constant region of a heavy chain and a light chain of a human antibody. A chimeric antibody can be obtained by linking a DNA encoding a variable region of a mouse antibody to a DNA encoding the constant region of a human antibody, integrating the resultant to an expression vector, and introducing the obtained vector into a host to produce a chimeric antibody.

Humanized antibodies, also referred to as reshaped human antibodies, are non-human mammalian, e.g., mice antibodies in which the complementarity determining region (CDR) is grafted to the complementarity determining region of a human antibody, and the general gene recombination approaches are also known. Specifically, a DNA sequence designed to link the CDR of a mouse antibody to the framework region (FR) of a human antibody is synthesized by PCR from several oligonucleotides prepared so as to have overlapping portions at the ends. The resulting DNA is linked to a DNA encoding a human antibody constant region, then incorporated into an expression vector, and introduced into a host to produce a humanized antibody. (See, European Patent Application Publication No. 239400, and WO 96/02576). As the FR of a human antibody to be linked via CDR, an FR whose complementarity determining region form a good antigen binding site is selected. If necessary, amino acids in the framework region of the variable region of the antibody may be substituted so that the complementarity determining region of the reshaped human antibody forms an appropriate antigen binding site (Sato, K. et al., Cancer Res. (1993) 53, 851-856).

Techniques for substituting an amino acid of an antibody to improve the activity, physical properties, pharmacokinetics, safety, and the like of the antibody are also known, such as the techniques described below. In one aspect of the present invention, antibodies in which such amino acid substitutions (including deletions and additions) have been applied are also included in the antibody used.

As techniques for applying amino acid substitutions on a variable region of an IgG antibody, humanization (Tsurushita N, Hinton P R, Kumar S., Design of humanized antibodies: from anti-Tac to Zenapax., Methods. 2005 May; 36(1):69-83.), as well as affinity maturation by amino acid substitution in the complementarity determining region (CDR) to enhance binding activity (Rajpal A, Beyaz N, Haber L, Cappuccilli G, Yee H, Bhatt R R, Takeuchi T, Lerner R A, Crea R., A general method for greatly improving the affinity of antibodies by using combinatorial libraries., Proc Natl Acad Sci USA. 2005 Jun. 14; 102(24):8466-71.), and improvement of the physicochemical stability by amino acid substitution in the framework (FR) (Ewert S, Honegger A, Pluckthun A., Stability improvement of antibodies for extracellular and intracellular applications: CDR grafting to stable frameworks and structure-based framework engineering., Methods. 2004 October; 34(2):184-99. Review) have been reported. In addition, as techniques for performing amino acid substitutions in the Fc region of an IgG antibody, techniques for enhancing antibody-dependent cytotoxic activity (ADCC) and complement-dependent cytotoxic activity (CDC) are known (Kim S J, Park Y, Hong H J., Antibody engineering for the development of the therapeutic antibodies., Mol Cells. 2005 Aug. 31; 20(1):17-29. Review.). Furthermore, techniques for amino acid substitution in Fc that not only enhance such effector functions but also improve the blood half-life of the antibody have been reported (Hinton P R, Xiong J M, Johlfs M G, Tang M T, Keller S, Tsurushita N., An engineered human IgG1 antibody with longer serum half-life., J Immunol. 2006 Jan. 1; 176(1):346-56; and Ghetie V, Popov S, Borvak J, Radu C, Matesoi D, Medesan C, Ober R J, Ward E S., Increasing the serum persistence of an IgG fragment by random mutagenesis., Nat Biotechnol. 1997 July; 15(7):637-40.). Various amino acid substitution techniques for constant regions aimed at improving the physical properties of antibodies are also known (WO 09/41613).

Methods for obtaining human antibodies are also known. For example, a desired human antibody having a binding activity to an antigen can be obtained by sensitizing human lymphocytes in vitro with a desired antigen or a cell expressing the desired antigen, and fusing the sensitized lymphocytes with human myeloma cells, e.g., U266 (see, JP 1-59878 B). The desired human antibody can also be obtained by immunizing a transgenic animal with an antigen having all the repertoires of the human antibody gene (see WO 93/12227, WO 92/03918, WO 94/02602, WO 94/25585, WO 96/34096, WO 96/33735). In addition, a technique of obtaining a human antibody by panning using a human antibody library is also known. For example, it is possible to select a phage that binds to an antigen by expressing a variable region of a human antibody as a single-chain antibody (scFv), on the surface of the phage, by a phage display method. By analyzing the gene of the selected phage, it is possible to determine the DNA sequence encoding a variable region of a human antibody that binds to the antigen. Once the DNA sequence of the scFv that binds to the antigen is revealed, an appropriate expression vector containing the sequence can be generated and a human antibody can be obtained. These methods are already well known, and WO 92/01047, WO 92/20791, WO 93/06213, WO 93/11236, WO 93/19172, WO 95/01438, and WO 95/15388 can be referred to. In one aspect of the present invention, the antibody used also includes such human antibodies.

When an antibody gene is isolated once and introduced into an appropriate host to produce an antibody, an appropriate combination of a host and an expression vector can be used. When a eukaryotic cell is used as the host, an animal cell, a plant cell, and a fungal cell can be used. As the animal cell, (1) a mammalian cell, such as CHO, COS, myeloma, BHK (baby hamster kidney), HeLa, Vero, (2) an amphibian cell, such as *Xenopus* oocyte, and (3) an insect cell, such as sf9, sf21, or Tn5, are known. As the plant cell, a cell from the genus *Nicotiana*, such as *Nicotiana tabacum*, is known and may be callus cultured for production. As the fungus cell, yeast, for example, of the genus *Saccharomyces*, such as *Saccharomyces cerevisiae*, filamentous fungi, for example, of the genus *Aspergillus*, such as *Aspergillus niger*, and the like are known. When prokaryotic cells are used, the production systems include production systems using bacterial cells. *E. coli* and *Bacillus subtilis* are known as bacterial cells. Antibodies are obtained by introducing the antibody gene of interest into these cells by transformation and culturing the transformed cells in vitro.

The antibody used in the pharmaceutical formulation further includes a modified antibody. For example, antibodies linked to various molecules, such as polyethylene glycol (PEG) and cytotoxic agents, can also be used (Farmaco. 1999 Aug. 30; 54 (8): 497-516., Cancer J. 2008 May-June; 14 (3): 154-69.). Such a modified antibody can be obtained by chemically modifying the antibody. These methods have already been established in this field.

In one aspect of the present invention, the antibody in the present disclosure may be a chimeric antibody. Chimeric antibodies are described, for example, in U.S. Pat. No. 4,816,567 and Morrison et al, Proc. Natl. Acad. Sci. USA, 81:6851-6855 (1984). Chimeric antibodies may contain non-human variable regions (e.g., variable regions derived from non-human primates such as monkeys, mice, rats, hamsters, rabbits, or the like) and human constant regions.

In one aspect of the present invention, the antibody in the present disclosure may be a humanized antibody. Typically, non-human antibodies are humanized to reduce their immunogenicity in humans while maintaining the specificity and affinity of the parent non-human antibody. Typically, humanized antibodies contain one or more variable regions, among which HVRs, such as CDRs (or portions thereof) derived from non-human antibodies and FRs (or portions thereof) derived from human antibody sequences, are present. Humanized antibodies can optionally contain at least a portion of the human constant region. In one embodiment, amino acid residues of the FR within a humanized antibody may be substituted with corresponding amino acid residues of a non-human antibody (e.g., the antibody from which the HVR residue was derived), for example, to maintain or improve the specificity or affinity of the antibody.

Humanized antibodies and methods for their production have been reviewed, for example, in the following (Almagro and Fransson, Front. Biosci. 13:1619-1633 (2008)), and further described, for example, in: Riechmann et al., Nature 332:323-329 (1988); Queen et al., Proc. Nat'l Acad. Sci. USA 86:10029-10033 (1989); U.S. Pat. Nos. 5,821,337, 7,527,791, 6,982,321, and 7,087,409; Kashmiri et al., Methods 36:25-34 (2005) (describing specificity determining region (SDR) grafting); Padlan, Mol. Immunol. 28:489-498 (1991) (describing "resurfacing"); Dall'Acqua et al., Methods 36:43-60 (2005) (describing "FR shuffling"); and Osbourn et al., Methods 36:61-68 (2005) and Klimka et al., Br. J. Cancer, 83:252-260 (2000) (describing the "guided selection" approach to FR shuffling).

In one aspect of the present invention, the human framework that would be used for humanization may include, for example, a framework selected using the "best fit" method (Sims et al. J. Immunol. 151:2296 (1993)), a framework derived from the consensus sequence of a human antibody of a particular subgroup with heavy- or light-chain variable regions (Carter et al. Proc. Natl. Acad. Sci. USA, 89:4285 (1992) and Presta et al. J. Immunol., 151:2623 (1993)), framework regions derived from screening of FR libraries (Baca et al., J. Biol. Chem. 272:10678-10684 (1997) and Rosok et al., J. Biol. Chem. 271:22611-22618(1996)).

In one aspect of the present invention, the antibody in the present disclosure may be a human antibody. Human antibodies can be produced by various techniques. Human antibodies are outlined, for example, in van Dijk and van de Winkel, Curr. Opin. Pharmacol. 5: 368-374 (2001) and Lonberg, Curr. Opin. Immunol. 20:450-459 (2008). Human antibodies may be prepared by administering an immunogen to a transgenic animal that has been altered to produce a complete human antibody or a complete antibody with human variable regions in response to an antigen. Such animals typically contain all or some of the human immunoglobulin loci, and all or some of the human immunoglobulin loci replace the endogenous immunoglobulin loci, or are present outside the chromosomes or randomly incorporated into the chromosomes of the animals. In such transgenic mice, the endogenous immunoglobulin loci are usually inactivated. For a review of the methods for obtaining human antibodies from transgenic animals, see Lonberg, Nat. Biotech. 23:1117-1125 (2005). See also, for example, U.S. Pat. Nos. 6,075,181 and 6,150,584 describing XENO-MOUSE (trademark) technology; U.S. Pat. No. 5,770,429 describing HUMAB (registered trademark) technology; U.S. Pat. No. 7,041,870 describing K-M MOUSE (registered trademark) technology; and US 2007/0061900 describing VELOCIMOUSE (registered trademark) technology. The human variable region from the complete antibody generated by such animals may be further modified, for example, by combining it with a different human constant region.

In another aspect of the present invention, human antibodies can also be produced by a method based on hybridomas. Human myeloma cells and mouse-human heteromyeloma cell lines for the production of human monoclonal antibodies are described below (e.g., Kozbor, J. Immunol. 133, 3001 (1984); Brodeur et al., Monoclonal Antibody Production Techniques and Applications, pp. 51-63 (Marcel Dekker, Inc., New York, 1987); and Boerner et al., J. Immunol., 147: 86 (1991). Human antibodies generated via human B-cell hybridoma technology are described in Li et al. Proc. Natl. Acad. Sci. USA, 103:3557-3562 (2006). Examples of other methods may include U.S. Pat. No. 7,189,826 (describing the production of monoclonal human IgM antibodies from hybridoma cell lines) and Ni, Xiandai Mianyixue, 26(4):265-268 (2006) (describing human-human hybridomas). Human hybridoma technology (trioma technology) is described in Vollmers and Brandlein, Histology and Histopathology, 20(3):927-937 (2005) and Vollmers and Brandlein, Methods and Findings in Experimental and Clinical Pharmacology, 27(3):185-91 (2005).

In another aspect of the present invention, human antibodies can also be generated by isolating Fv clone variable domain sequences selected from human-derived phage display libraries. Such variable region sequences can then be combined with the desired human constant region. See below for techniques to select human antibodies from antibody libraries.

In one aspect of the present invention, the antibody in the present disclosure may be isolated by screening combinatorial libraries for antibodies having one or more desired activities. For example, methods for producing phage display libraries and methods for screening such libraries for antibodies having desired binding properties are known in the art. Such methods are reviewed in Hoogenboom et al. in Methods in Molecular Biology 178:1-37 (O'Brien et al., ed., Human Press, Totowa, NJ, 2001), and are further described in, for example, McCafferty et al., Nature 348:552-554; Clackson et al., Nature 352: 624-628 (1991); Marks et al., J. Mol. Biol. 222: 581-597 (1992); Marks and Bradbury, Molecular Biology 248:161-175 (Lo, ed., Human Press, Totowa, NJ, 2003); Sidhu et al., J. Mol. Biol. 338(2): 299-310 (2004); Lee et al., J. Mol. Biol. 340(5): 1073-1093 (2004); Fellouse, Proc. Natl. Acad. Sci. USA 101(34): 12467-12472 (2004); and Lee et al., J. Immunol. Methods 284(1-2): 119-132(2004).

In a particular phage display method in one aspect of the present invention, the VH and VL repertoires can be cloned separately by polymerase chain reaction (PCR) and randomly recombined in a phage library, which may be screened for antigen-binding phages as described in Winter et al., Ann. Rev. Immunol., 12: 433-455 (1994). Phages present antibody fragments such as scFv and Fab. Libraries from immunized sources can provide high-affinity antibodies to immunogens without the need of constructing hybridomas. In another embodiment, naive repertoires can also be cloned (e.g., from humans) without immunization to provide single-origin antibodies to a wide range of non-self or self-antigens, as described in Griffiths et al., EMBO J, 12: 725-734 (1993). In yet another embodiment, naive libraries can be synthetically produced by cloning pre-rearranged V-gene segments from stem cells, and using PCR primers that encode the hypervariable region CDR3 and contain random sequences for achieving reconstitution in vitro, as described in Hoogenboom and Winter, J. Mol. Biol., 227: 381-388 (1992). Examples of patent literatures describing human antibody phage libraries include U.S. Pat. No. 5,750, 373, US2005/0079574, US2005/0119455, US2005/ 0266000, US2007/0117126, US2007/0160598, US2007/ 0237764, US2007/0292936, and US2009/0002360.

Antibodies or antibody fragments isolated from human antibody libraries are considered as human antibodies or human antibody fragments in the present specification.

In one aspect of the present invention, the antibody in the present disclosure is a multispecific antibody (e.g., a bispecific antibody). Multispecific antibodies are antibodies (e.g., monoclonal antibodies) that have binding specificity to at least two different sites. In one embodiment, one of the binding specificities is for an antigen and the other is for another antigen. In another embodiment, the bispecific antibody may bind to two different epitopes of an antigen. The bispecific antibodies may be used to localize cytotoxic agents to cells expressing an antigen. The bispecific antibodies may be prepared as full-length antibodies or as antibody fragments.

Examples of the method for preparing a multispecific antibody include, but are not limited to, recombinant coexpression of two immunoglobulin heavy chain-light chain pairs having different specificities (e.g., Milstein and Cuello, Nature 305: 537 (1983), WO93/08829, and Traunecker et al., EMBO J. 10: 3655 (1991)), and the knob-in-hole technique (e.g., U.S. Pat. No. 5,731,168). The multispecific antibody may also be prepared by manipulating electrostatic steering effects for preparing a Fc heterodimer molecule (e.g., WO2009/089004A1); crosslinking two or more antibodies or antibody fragments (e.g., U.S. Pat. No. 4,676,980 and Brennan et al., Science, 229: 81(1985)); preparing an antibody having two specificities using a leucine zipper (e.g., Kostelny et al., J. Immunol., 148(5):1547-1553 (1992)); preparing a bispecific antibody fragment using the "diabody" technique (e.g., Hollinger et al., Proc. Natl. Acad. Sci. USA, 90:6444-6448 (1993)); using an scFv dimer (e.g., Gruber et al., J. Immunol., 152:5368 (1994)); and preparing a trispecific antibody (e.g., Tutt et al. J. Immunol. 147: 60 (1991). Furthermore, it may be an antibody manipulated to have three or more functional antigen-binding sites, including an "octopus antibody" (e.g., US2006/0025576).

In one aspect of the present invention, the antibody or antibody fragment thereof in the present disclosure may be a "dual-acting Fab" or "DAF" that contains one antigen-binding site that binds to an antigen and another different antigen (e.g., US2008/0069820).

In one aspect of the present invention, an antibody with an altered amino acid sequence (mutant) in the present disclosure can be prepared by introducing appropriate modifications to the nucleic acid encoding the antibody molecule, or by synthesizing peptides. Such modifications may be made by one, or appropriately combining a plurality of, arbitrary deletions, insertions, or substitutions of any amino acid (residue) into the amino acid sequence. Any combination of deletions, insertions, and substitutions can be utilized as long as the final construct has the desired characteristics (e.g., antigen binding).

In one aspect of the present invention, when antibody variants (mutants) with one or more amino acid substitutions are provided, the target sites for introducing substitutive mutations can include HVR and FR.

In one aspect of the present invention, the concentration of the antibody in the aqueous solution may be in the range of 10 to 300 mg/mL, 20 to 200 mg/mL, or 30 to 150 mg/mL.

2. Surfactant

In one aspect of the present invention, the pharmaceutical formulation further contains, as a surfactant, a poloxamer such as poloxamer 188, a polysorbate such as polysorbate 20 and polysorbate 80, Triton X such as Triton (registered trademark) X-100 and Triton X-114, Brij such as Brij (registered trademark)-35 and Brij-58, and a nonionic surfactant such as Nonidet (trademark) P-40, octyl glucoside, and octyl thioglucoside, but are not limited thereto.

In one aspect of the present invention, the amount of surfactant added to the pharmaceutical formulation is generally 0.001 to 100 mg/mL, preferably 0.01 to 10 mg/mL, 0.05 to 5 mg/mL, and more preferably 0.1 to 1 mg/mL.

(1) Poloxamer

In the present specification, a poloxamer is a block copolymer of ethylene oxide and propylene oxide. In the present specification, "polyethylene oxide/polypropylene oxide copolymer," "PPC," "PX," or "poloxamer" means a block copolymer represented by the following formula Ia:

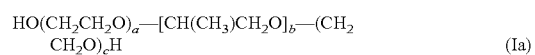

(Ia)

which contains a central block of polypropylene oxide (PPO) with polypropylene oxide (PPO) as the central block and blocks of polyethylene oxide (PEO) on both sides. In the above formula: a, b and c are average numbers, a and c may be the same or different. a and c are each a number such that the hydrophilic portion represented by $(C_2H_4O)$ (i.e., the polyethylene oxide portion of the copolymer) constitutes about 60% to 90% by weight of the copolymer, for example 70% to 90% by weight of the copolymer; and b is a number such that the hydrophobic substance represented by $(C_3H_6O)_b$ (i.e., the polypropylene oxide portion of the copolymer) has a molecular weight of approximately 950 to 4,000 daltons (Da), for example about 1,200 to 3,500 Da, for example 1,200 to 2,300 Da, 1,500 to 2,100 Da, 1,400 to 2,000 Da or 1,700 to 1,900 Da. For example, the molecular weight of the hydrophilic portion can be 5,000 to 15,000 Da. Exemplary poloxamers having the above general formula are poloxamers where a or c is a number from 5 to 150 and b is a number from 15 to 75, for example, a and c are numbers between about 60 and 85, preferably between 75 and 85, such as 79, and b is a number between 22 and 40, preferably between 22 and 33, 25 and 30, or 35 and 40, and most preferably between 22 and 33. The average total molecular weight of the compound is approximately 6,840 to 9,510 Da, preferably 6,840 to 8,830 Da or 7,680 to 9,510 Da, for example, generally 8,400 to 8,800 Da, such as about 8,400 Da or 8,400 Da. Examples of poloxamers include poloxamer 188 (e.g., those sold under Pluronic (registered trademark) F-68, Synperonic (trademark) PE/F 68, Flocor (registered trademark), Kolliphor (registered trademark) and Lutrol (registered trademark), Poloxamer 188 EMPROVE (registered trademark) EXPERT, and Pronon (registered trademark)). The quality of commercial grade poloxamer 188 varies among suppliers. In addition, the quality of poloxamer 188 can vary from lot to lot, even if they are of the same grade from the same supplier. Examples of poloxamers further include poloxamer 237 (e.g., those sold under Pluronic (registered trademark) F-87, and Synperonic (trademark) PE/F 87).

The nomenclature of polyethylene oxide/polypropylene oxide copolymers is related to the monomer composition. Multiplying the upper two digits of the poloxamer number by 100 gives the approximate molecular weight of the hydrophobic polypropylene oxide block. Multiplying the last digit by 10 allows to obtain the approximate weight percent of hydrophilic polyethylene oxide content. For example, poloxamer 188 represents a polymer having a hydrophilic polyethylene oxide block content of about 80% of the total molecular weight, and containing about 1,800 Da of polypropylene oxide hydrophobic substance. In addition, poloxamer 237 represents a polymer having a hydrophilic polyethylene oxide block content of about 70% of the total molecular weight, and containing about 2,300 Da of polypropylene oxide hydrophobic substance. Here, polyethylene oxide is also called polyoxyethylene and polypropylene oxide is also called polyoxypropylene.

Poloxamers can be synthesized in two steps, first by building a polypropylene oxide core and then adding polyethylene oxide to the ends of the polypropylene oxide core. Due to the variability in polymerization rates during both steps, poloxamers include heterogeneous polymer species of various molecular weights. The distribution of polymer species can be characterized using standard techniques including, but not limited to, gel permeation chromatography (GPC).

As one mode of the present invention, the average number of polyethylene oxide and polypropylene oxide blocks contained in various poloxamers, as well as their number-average molecular weight are shown in Table 1.

TABLE 1

| Type of Poloxamer | Ethylene Oxide Units (a) (c) | Propylene Oxide (b) | Number-Average Molecular Weight |
|---|---|---|---|
| 124 | 10-15 | 18-23 | 2090-2360 |
| 188 | 75-85 | 25-30 | 7680-9510 |
| 237 | 60-68 | 35-40 | 6840-8830 |
| 338 | 137-146 | 42-47 | 12700-17400 |
| 407 | 95-105 | 54-60 | 9840-14600 |

In the present specification, a, c, and b in formula I:

$$HO(C_2H_4O)_a(C_3H_6O)_b(C_2H_4O)_cH \quad (I)$$

representing the poloxamer, are the average number of $(C_2H_4O)$ and $(C_3H_6O)$ units in the poloxamer, respectively. Here, $(C_2H_4O)$ means $((CH_2)_2O)$ and is also called an ethylene oxide (EO) unit. $(C_3H_6O)$ means $(CH(CH_3)CH_2O)$ and is also called a propylene oxide (PO) unit. The average of ethylene oxide and propylene oxide units can be calculated by obtaining the EO/PO ratio of the poloxamer fraction of interest by NMR, and then using the molecular weight obtained by performing a MALDI-FTICR-MS of that fraction as input value. The EO/PO ratio is calculated based on the following equation, where the methyl group peak in NMR is the area integral of propylene oxide $I_{PO}$ and $I_{EO+PO}$ is the combined area integral of ethylene oxide (4 hydrogens) and propylene oxide (3 hydrogens) (Non Patent Literature 2).

$$EO/PO = (I_{EO+PO}/I_{PO} - 1) \times (3/4)$$

In one mode of the present invention, poloxamer 188 (also called P-188, PX188 or P188) refers to a polyethylene oxide/polypropylene oxide copolymer having the following formula Ia:

$$HO(CH_2CH_2O)_a\text{—}[CH(CH_3)CH_2O]_b\text{—}(CH_2CH_2O)_cH \quad (Ia)$$

wherein a, b and c are average numbers, a and c can be the same or different, each being a number such that the hydrophilic portion represented by $(C_2H_4O)$ (i.e., the polyethylene oxide portion of the copolymer) constitutes about 60% to 90%, for example 80%, and b is a number such that the hydrophobic substance represented by $(C_3H_6O)$ has a molecular weight of approximately 1,300 to 2,300 Da, for example 1,400 to 2,000 Da, such as approximately 1,750 Da. For example, a and c are numbers between about 75 and 85, such as 79, and b is a number between 25 and 30, or preferably between 22 and 33, such as 28. The average total molecular weight of the compound is approximately 7,680 to 9,510 Da, for example, generally 8,400 to 8,800 Da, such as about 8,400 Da or 8,400 Da. Poloxamer 188 can contain a heterogeneous distribution of polymer species that vary primarily in overall polymer chain length but also include cleaved polymer chains with unsaturation and some low molecular weight glycols. Those exhibiting species profiles (e.g., determined by GPC) that include main peaks representing low molecular weight (LMW) and high molecular weight (HMW) polymer species and "shoulder" peaks on both sides are also included in poloxamer 188. In one aspect of the present invention, the poloxamer may be a poloxamer obtained by purifying poloxamer 188 to remove or reduce the species other than the main component.

Poloxamer 188 may be referred to as "polyoxyethylene (160) polyoxypropylene (30) glycol" in the Japanese Pharmacopoeia standards.

When used in the present specification, "main component" or "main peak" in relation to poloxamer 188 refers to a species of copolymer molecules having a molecular weight less than about 13,000 Da and greater than about 4,500 Da and a number-average molecular weight of about 7,680 to 9,510 Da, for example, generally 8,400 to 8,800 Da, such as about 8,400 Da or 8,400 Da. The main peak species include those eluting by gel permeation chromatography (GPC) in 14 to 15 minutes depending on chromatographic conditions (see U.S. Pat. No. 5,696,298).

In one mode of the present invention, poloxamer 237 (also called P-237, PX237 or P237) refers to a polyethylene oxide/polypropylene oxide copolymer having the following formula Ia:

$$HO(CH_2CH_2O)_a\text{—}[CH(CH_3)CH_2O]_b\text{—}(CH_2CH_2O)_cH \quad (Ia)$$

wherein a, b and c are average numbers, a and c can be the same or different, each being a number such that the hydrophilic portion represented by $(C_2H_4O)$ (i.e., the polyethylene oxide portion of the copolymer) constitutes about 60% to 80%, for example 70%, and b is a number such that the hydrophobic substance represented by $(C_3H_6O)$ has a molecular weight of approximately 1,800 to 2,800 Da, for example 2,000 to 2,600 Da, such as approximately 2,300 Da. For example, a and c are numbers between about 60 and 68, such as 64, and b is a number between 35 and 40, or preferably between 32 and 43, such as 37. The average total molecular weight of the compound is approximately 6,840 to 8,830 Da, for example, generally 7,500 to 8,000 Da, such as about 7,800 Da or 7,800 Da. Poloxamer 237 can contain a heterogeneous distribution of polymer species that vary primarily in overall polymer chain length but also include cleaved polymer chains with unsaturation and some low molecular weight glycols. Those exhibiting species profiles (e.g., determined by GPC) that include main peaks representing low molecular weight (LMW) and high molecular weight (HMW) polymer species and "shoulder" peaks on both sides are also included in poloxamer 237. In one aspect of the present invention, the poloxamer may be a poloxamer obtained by purifying poloxamer 237 to remove or reduce the species other than the main component.

(2) Polysorbate

Polysorbate is a fatty acid ester that is useful as a nonionic surfactant and protein stabilizer, and has the following chemical formula II or III:

[Formula 1]

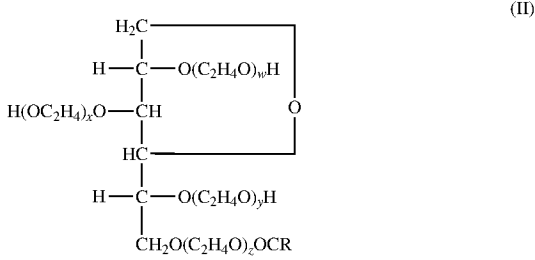

(II)

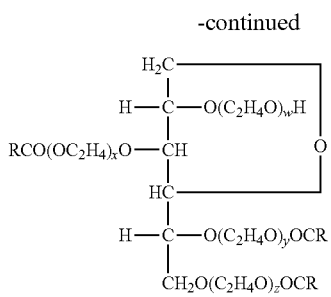

wherein w+x+y+z is an integer selected from 15 to 25, and

R is independently an alkyl or alkenyl having 11 or more carbon atoms. Polysorbate 20, polysorbate 40, polysorbate 60, and polysorbate 80 are widely used as stabilizers and emulsifiers in the pharmaceutical, cosmetic, and food industries. Polysorbate 20 mainly contains a monolaurate ester of polyoxyethylene (20) sorbitan. Polysorbate 40 mainly contains a monopalmitate ester of polyoxyethylene (20) sorbitan. Polysorbate 60 mainly contains a monostearate ester of polyoxyethylene (20) sorbitan. Polysorbate 80 mainly contains a monooleate ester of polyoxyethylene (20) sorbitan.

Polysorbate is often a mixture of various chemical substances, consisting mostly of polyoxyethylene (20) sorbitan monoesters, and sometimes containing isosorbide ester contaminants. These can also include, for example, polyethylene glycol (PEG), intermediate structures, and fatty acid reactants. The head group (in this case polyoxyethylene (20) sorbitan) is a sorbitan (including 1,4-anhydrosorbitol, 1,5-anhydrosorbitol, and 1,4,3,6-dianhydrosorbitol) with three of its alcohol groups substituted to form ether bonds with three polyethylene oxide groups.

3. Other Additives

In one aspect of the present invention, the pharmaceutical formulation can be prepared by mixing with suitable pharmaceutically acceptable carriers, media, and the like, as needed, to make a solution formulation. The solvent of the solution formulation is water or a pharmaceutically acceptable organic solvent. Examples of such organic solvents include propylene glycol (1,2-propanediol), polyethylene glycol 300, polyethylene glycol 400, ethanol, glycerol, and acetic acid. Examples of suitable pharmaceutically acceptable carriers and media include sterile water, saline, stabilizers, antioxidants (such as ascorbic acid), buffering agents (such as phosphoric acid, citric acid, histidine, and other organic acids), preservatives, chelating agents (such as EDTA), and binders. In addition, other low molecular weight polypeptides, proteins such as serum albumin, gelatin and immunoglobulin, amino acids such as glycine, glutamine, asparagine, glutamic acid, aspartic acid, methionine, arginine and lysine, sugars and carbohydrates such as polysaccharides and monosaccharides, and sugar alcohols such as mannitol and sorbitol may be contained. When used as a solution for injection, examples of the aqueous solution include saline, an isotonic solution containing glucose or other adjuncts, for example, D-sorbitol, D-mannose, D-mannitol, and sodium chloride, which may be used in combination with an appropriate solubilizing agent, for example, alcohol (such as ethanol), and a polyalcohol (such as propylene glycol and PEG).

In one aspect of the present invention, the buffering agent used in the solution formulation is prepared using a substance for maintaining the pH of the solution. In one aspect of the present invention, in the high concentration antibody-containing solution formulation, the pH of the solution is preferably 4.5 to 7.5, more preferably 5.0 to 7.0, and further preferably 5.5 to 6.5. In one aspect of the present invention, the buffering agent that can be used is a buffering agent that is pharmaceutically acceptable and can adjust the pH in this range. Such a buffering agent is known to those skilled in the art of solution formulations, and examples thereof include inorganic salts such as phosphate (sodium or potassium phosphate), sodium hydrogen carbonate, and the like; organic acid salts such as citrate (sodium or potassium citrate), sodium acetate, sodium succinate and the like; and acids such as phosphoric acid, carbonic acid, citric acid, succinic acid, malic acid, or gluconic acid. Further examples include Tris and Good buffering agents such as MES, MOPS, or HEPES, histidine (e.g., histidine hydrochloride), and glycine.

The concentration of the buffering agent is generally 1 to 500 mmol/L, preferably 5 to 100 mmol/L, further preferably 10 to 20 mmol/L. When a histidine buffering agent is used, the buffering agent preferably contains 5 to 25 mmol/L histidine, further preferably 10 to 20 mmol/L histidine.

In one aspect of the present invention, the high concentration antibody-containing solution formulation is preferably stabilized by adding a stabilizer suitable for the antibody that is an active ingredient. In one aspect of the present invention, the "stable" high concentration antibody-containing solution formulation has no significant change observed for at least 12 months, preferably two years, further preferably three years at refrigerated temperature (2-8° C.); or for at least three months, preferably six months, further preferably one year at room temperature (22-28° C.). For example, the total amount of the dimer and the decomposition product after 2 years of storage at 5° C. is 5.0% or less, preferably 2% or less, further preferably 1.5% or less, or the total amount of the dimer and the decomposition product after 6 months of storage at 25° C. is 5.0% or less, preferably 2% or less, further preferably 1.5% or less.

In addition, the formulation of the present invention can optionally contain a cryoprotectant, a suspending agent, a dissolution aid, an isotonic agent, a preservative, an anti-adsorption agent, a diluent, an excipient, a pH adjuster, an analgesic agent, a sulfur-containing reducing agent, an antioxidant, and the like.

Examples of cryoprotectants include sugars such as trehalose, sucrose, and sorbitol.

Examples of the solution aid include polyethylene oxide cured castor oil, polysorbate 80, nicotinic acid amide, polyethylene oxide sorbitan monolaurate, macrogol, and castor oil fatty acid ethyl esters.

Examples of the isotonic agent include sodium chloride, potassium chloride, and calcium chloride.

Examples of the preservative include methyl paraoxybenzoate, ethyl paraoxybenzoate, sorbic acid, phenol, cresol, and chlorocreazole.

Examples of the anti-adsorption agent include human serum albumin, lecithin, dextran, ethylene oxide-propylene oxide copolymer, hydroxypropyl cellulose, methyl cellulose, polyethylene oxide cured castor oil, and polyethylene glycol.

Examples of the sulfur-containing reducing agent include N-acetylcysteine, N-acetylhomocysteine, thioctic acid, thiodiglycol, thioethanolamine, thioglycerol, thiosorbitol, thioglycol acid and a salt thereof, sodium thiosulfate, glutathione, and those having a sulfhydryl group such as a thioalkanoic acid having 1 to 7 carbon atoms.

Examples of the antioxidant include erythorbic acid, dibutyl hydroxytoluene, butyl hydroxyanisole, alpha-tocopherol, tocopherol acetate, L-ascorbic acid and a salt thereof, L-ascorbic acid palmitate, L-ascorbic acid stearate, sodium bisulfite, sodium sulfite, triamyl gallate, propyl gallate, or a chelating agent such as disodium ethylenediaminetetraacetate (EDTA), sodium pyrophosphate, or sodium metaphosphate.

4. Surfactant that Reduce Particle Formation (1) Hydrophobicity

In one aspect of the present invention, the use of a highly hydrophobic surfactant allows to reduce particle formation in the pharmaceutical formulation containing antibodies.

Poloxamer is a three-block amphiphilic copolymer consisting of one block of hydrophobic polypropylene oxide (PPO) chain and two blocks of hydrophilic polyethylene oxide (PEO) chain positioned on both sides, where the PPO chain consists of an average number of propylene oxides between 22 and 40, preferably between 22 and 33, 25 and 30, or 35 and 40, and most preferably between 22 and 33, and the PEO chains each consist of an average of 75 to 85 units of ethylene oxide. Propylene oxide is the hydrophobic component and ethylene oxide is the hydrophilic component. Poloxamers with more hydrophobic components are more hydrophobic.

In one aspect of the present invention, the poloxamer includes poloxamers containing PPO chains consisting of 34 or more units of propylene oxide at a ratio of 3%, 6%, 20%, or 29% (w/w) or more of the total poloxamer.

In one aspect of the present invention, the differences in hydrophobicity of the poloxamers can be confirmed by reversed-phase chromatography. In reversed-phase chromatography, the distribution of the length of the PPO block can be determined by setting the PEO block to not interact with the stationary phase. This method also allows to analyze the differences in hydrophobicity of the poloxamers (Non Patent Literature 2). In one aspect of the present invention, the conditions for the reversed-phase chromatography of the poloxamer are set as follows, with reference to Non Patent Literature 2. For the reversed-phase chromatography, an HPLC column packed with macroporous styrene divinylbenzene, such as Agilent Technologies' PLRP-S column, is used.

[High-Performance Liquid Chromatography Conditions]
(1) Column: PLRP-S column (1000 Å, 5 μm, 50×2.1 mm; Agilent Technologies)
(2) Mobile phase:
  Mobile phase A: Ultrapure water
  Mobile phase B: Acetonitrile
(3) Elution gradient program
  From 0 minute to 16.0 minutes: Mobile phase B 58% to 64%
  From 16.0 minutes to 18.5 minutes: Mobile phase B 64% to 90%
  From 18.5 minutes to 21.5 minutes: Mobile phase B fixed at 90%
  From 21.5 minutes to 23.5 minutes: Mobile phase B 90% to 100%
  From 23.5 minutes to 30.0 minutes: Mobile phase B fixed at 100%
  From 30.0 minutes to 30.1 minutes: Mobile phase B 100% to 58%
  From 30.1 minutes to 40.0 minutes: Mobile phase B fixed at 58%
(4) Flow rate: 0.2 mL/min
(5) Detection method: Evaporative light scattering detection (drift tube temperature: 50±25° C., nebulizer heating power level: 75%, gain value: 250, gas pressure: 20 psi)
(6) Column temperature: 65±5° C.
(7) Poloxamer concentration (in ultrapure water): 0.5 mg/mL.

In one aspect of the present invention, in the chromatography of the poloxamers under the above conditions, the eluates after 17 minutes of elution time correspond to poloxamers with high hydrophobicity, and the peak area after 17 minutes of elution time is 3% or more, 6% or more, 19% or more, 33% or more, or 35% or more of the total peak area.

In one aspect of the present invention, in the chromatography of the poloxamers under the above conditions, the peak area after 17 minutes of elution time is 3% or more, 6% or more, 20% or more, 36% or more, or 46% or more of the total peak area after 1.5 minutes.

(2) Surface Tension

In one aspect of the present invention, the use of a surfactant that lowers the surface tension of the aqueous solution containing the surfactant allows to reduce particle formation in the aqueous solution of the pharmaceutical formulation containing antibodies. In one aspect of the present invention, examples of surfactants that can reduce particle formation include poloxamer 188, which has been identified in the Examples of the present invention, as well as poloxamer 237, polysorbate 20, polysorbate 60, polysorbate 65, and polysorbate 80. The higher the surfactant's surface activating ability is, the lower the surface tension of the aqueous solution containing the surfactant will be. There is a correlation between the poloxamer's hydrophobicity index and the surface tension value.

Surface tension can be measured by generally known methods such as, but not limited to, the Wilhelmy method (plate method, perpendicular plate method), du Nouy method (ring method, ring method), suspension method (pendant drop method) or maximum bubble pressure method.

In one aspect of the present invention, the aqueous solution containing the surfactant at a concentration of 0.5 mg/mL has a surface tension of 52.3 mN/m or less, 52 mN/m or less, 51 mN/m or less, 50.7 mN/m or less, 50.5 mN/m or less, or 39 mN/m or less.

(3) Degree of Unsaturation

In one aspect of the present invention, the use of a poloxamer with a low degree of unsaturation as the surfactant allows to reduce particle formation in the pharmaceutical formulation containing a specific antibody.

The degree of unsaturation can be obtained using a mercury(II) acetate solution by the method specified in the U.S. Pharmacopoeia.

Method for Preparing Mercury(II) Acetate Solution:

50 g of mercury(II) acetate is placed in a 1000 mL measuring flask and dissolved in about 900 mL of methanol with 0.5 mL of glacial acetic acid. This is diluted to volume with methanol, and then mixed. The liquid is discarded if yellow. It is filtered if cloudy. If it is still cloudy, it is discarded. If the preparation of the solution needs to be repeated, new reagents are used. This solution is stored in a brown bottle in a dark place to protect it from light.

Procedure for Calculating Degree of Unsaturation of Poloxamer:

About 15.0 g of poloxamer is transferred to a 250 mL Erlenmeyer flask. 50 mL of mercury(II) acetate solution is weighed and placed into a flask with a pipette and mixed with a magnetic stirrer until completely dissolved. The mixture is then allowed to stand for 30 minutes with occasional swirling.

10 g of sodium bromide crystals is added, and the mixture is stirred with a magnetic stirrer for about 2 minutes. About 1 mL of phenolphthalein test solution is added without delay, and the liberated acetic acid is titrated with potassium hydroxide 0.1 N in methanol volumetric solution. A control test is performed by the same method. The initial acidity is measured. 15.0 g of poloxamer is dissolved in 75 mL of methanol neutralized with potassium hydroxide in methanol to the endpoint of phenolphthalein. Then, about 1 mL of phenolphthalein test solution is added, and titration is performed with potassium hydroxide 0.1 N in methanol volumetric solution under nitrogen supply.

The degree of unsaturation (mEq/g) is calculated according to the following formula:

$$(V_U - V_B - V_A)N/15$$

where $V_U$, $V_B$, and $V_A$ are the volumes (mL) of potassium hydroxide 0.1N in methanol used for the titration of the test sample, blank, and initial acidity, respectively, and N is the normality of the volumetric solution.

In one aspect of the present invention, the degree of unsaturation of the poloxamer used as a surfactant is less than 0.018 mEq/g.

5. Reduction of Particle Formation (1) Reduction of Particle Formation

In one aspect of the present invention, "reducing particle formation" refers to preventing the formation of visually detectable particles or reducing the number of particles formed in an aqueous solution of a pharmaceutical formulation in which visually detectable particles are formed under given conditions. The reduction in the formation of visually detectable particles can be confirmed by counting the number of particles. The size and number of particles can be measured by light obscuration particle counting, microscopic particle counting, imaging flow cytometry, visual inspection, and microscopic infrared spectroscopy (IR) or microscopic Raman spectroscopy after particles are isolated, preferably by a combination of visual inspection and microscopic infrared spectroscopy or microscopic Raman spectroscopy.

(2) Visually Detectable Particles

In the present specification, visually detectable particles are particles that are visually detectable under high illuminance and have a diameter of 40 μm or more. Of these, particles that are visually detectable at standard illuminance (about 2,000 to 3,000 1×) as specified in the Pharmacopoeia are called "visible particles" or "insoluble visible particles." Visible particles generally have a diameter greater than 100 μm (Non Patent Literature 1). Particles that are smaller in size than visible particles and are not visible at the standard illuminance (about 2,000 to 3,000 1×) specified in the Pharmacopoeia but can be visually detected by increasing the illuminance or lengthening the observation time are "particles visually detectable only at high illuminance" and have a diameter of 40 μm to 100 μm. Visible particles are confirmed by gently swirling or tumbling a container in front of a black or white background and visually inspecting with the naked eye for 5 seconds or more under illumination at standard illuminance (about 2,000 to 3,000 1×). Particles that are visually detectable only at high illuminance are confirmed by gently swirling or tumbling a container in front of a black background and visually inspecting with the naked eye for 30 seconds or more under illumination at high illuminance (6,000 1× or more). Visible particles can also be confirmed by inspection at high illuminance.

In the present specification, a "protein-derived particle" refers to a visually detectable particle formed from a protein, including particles consisting only of protein and particles consisting of a complex of protein and polydimethylsiloxane (PDMS). The fact that the particles are resulting from protein molecules can be confirmed by microscopic Raman spectroscopy. The only protein contained in the solution is the active pharmaceutical ingredient (API), and the visually detectable particles are formed from the API. The number of visually detectable particles can be measured by light obscuration particle counting, microscopic particle counting, imaging flow cytometry, visual inspection, and microscopic infrared spectroscopy (IR) or microscopic Raman spectroscopy after particles are isolated, preferably by a combination of visual inspection and microscopic infrared spectroscopy or microscopic Raman spectroscopy.

In the present specification, an "aggregate" is a protein species with a relatively high molecular weight resulting from the aggregation of a large number of denatured proteins and is used interchangeably with the terms "macromolecular species" and "HMWS". Protein aggregates can generally vary in terms of: size (small (dimers) to large (microscopically identifiable or even visible particles) assembly, with diameters ranging from nanometers to micrometers), morphology (generally spherical to fibrous), protein structure (naive vs. non-native/denatured), type of intermolecular bond (covalent vs. non-covalent), reversibility, and solubility. Soluble aggregates cover a size range of approximately 1 to 100 nm, while protein particles cover the microscopically identifiable (about 0.1 to 100 μm) range and visible (>100 μm) range. All of the types of protein aggregates described above are generally encompassed by the term. Therefore, the term "(protein) aggregate" refers to any kind of non-native species in which two or more protein monomers are physically associated or chemically bound.

In one aspect of the present invention, the pharmaceutical formulation is stored at −30° C. to 25° C. without freezing the solution in the container, preferably from the freezing point of the solution to 25° C., more preferably 1° C. to 10° C., more preferably 2° C. to 8° C., and further preferably 5° C. Storage is performed for 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 25 hours, 26 hours, 27 hours, 28 hours, 29 hours, 30 hours, 31 hours, 32 hours, 33 hours, 34 hours, 35 hours, 36 hours, 48 hours, 60 hours, 72 hours, 84 hours, and 96 hours. Storage is performed for at least 24 hours, at least 2 days, at least 3 days, at least 4 days, at least 10 days, at least 20 days, at least 30 days, at least 40 days, at least 50 days, at least 60 days, at least 1 month, at least 2 months, at least 3 months, at least 4 months, at least 5 months, at least 6 months, at least 7 months, at least 8 months, at least 9 months, at least 10 months, at least 11 months, and at least 12 months.

5. Container

In one aspect of the present invention, the pharmaceutical formulation is filled in a container. The container is a plastic or glass syringe, cartridge, or vial.

In one aspect of the present invention, the pharmaceutical formulation for administration to a patient is filled in a syringe, a cartridge or a vial. In certain modes, the pharmaceutical formulation is placed in a syringe, cartridge or vial at a manufacturing filling facility. In certain modes, the syringe, cartridge or vial is sterilized before adding the composition. In certain modes, the syringe, cartridge or vial filled with the pharmaceutical formulation has a storage period of 1 day, at least 7 days, at least 14 days, at least 1 month, at least 6 months, at least 1 year, or at least 2 years before administration of the pharmaceutical formulation to the patient. In certain modes, the syringe, cartridge or vial is subjected to storage and/or transportation conditions.

In one mode of the present invention, the syringe, cartridge or vial is subjected to mechanical stress. Examples of mechanical stresses include, but are not limited to, drop stress and vibration stress. In one mode of the present invention, the syringe, cartridge or vial is subjected to drop stress once, twice, three times, four times, five times, six times, seven times, eight times, nine times, 10 times, 11 times, 12 times, 13 times, 14 times, 15 times, 16 times, 17 times, 18 times, 19 times, 20 times, 21 times, 22 times, 23 times, 24 times, 25 times, 25 times or more, 30 times or more, or 40 times or more. The stress applied to the syringe, cartridge, or vial when dropped vary with height, orientation, and the like in addition to the number of drops. Examples of the drop height include, but are not limited to, 38.1 cm as described in American Society for Testing and Materials (ASTM) D4169.

The syringe may be made of PP (polypropylene) or glass. The inner peripheral surface of the syringe may be coated with silicone oil as a lubricant.

In one aspect of the present invention, the silicone oil is polydimethylsiloxane. Some exemplary polydimethylsiloxanes include Dow Corning (registered trademark) 360 Medical fluid without limitation, including Dow Corning (registered trademark) 360 Medical Fluid with a viscosity of 350 centistokes, Dow Corning (registered trademark) 360 Medical Fluid with a viscosity of 1,000 centistokes, Dow Corning (registered trademark) 360 Medical Fluid with a viscosity of 12,500 centistokes, and Dow Corning (registered trademark) MDX4-4159 fluid, without limitation.

In one aspect of the present invention, the volume size (standard) of the syringe is not particularly limited. Specifically, the volume is 0.5 mL to 5.0 mL, preferably 1 mL or 2.25 mL.

In one aspect of the present invention, the volume size (standard) of the cartridge is not particularly limited. Specifically, the volume may be 0.5 mL to 20.0 mL, for example, 1.0 mL, 1.5 mL, 1.8 mL, 2.0 mL, 2.2 mL, 3.0 mL, 5.0 mL, 10.0 mL, 15.0 mL, or 20.0 mL, but is not limited to these amounts.

In one aspect of the present invention, the volume size (standard) of the vial is not particularly limited. Specifically, the volume may be 3 mL to 100 mL, for example, 3 mL, 5 mL, 10 mL, 15 mL, 20 mL, 30 mL, 50 mL, or 100 mL, but is not limited to these amounts.

The present invention will be further illustrated with reference to Examples given below, but is not limited by Examples below.

EXAMPLES

[Example 1] Component Analysis of Poloxamer 188 (PX188) by Reversed-Phase Chromatography An analysis by reversed-phase chromatography was performed to evaluate the length of the polypropylene oxide (PPO) block for the seven types of PX188 including different manufacturers, grades, and lots shown in Table 2. A previous paper was referred to regarding the method for analyzing PPO block length by reversed-phase chromatography (Non Patent Literature 1).

TABLE 2

Information and evaluation results of the PX188 and PS80 used

| Surfactant species | Sample ID | Manufacturer | Product name | Lot No. | Ratio of late eluates (%) | Ratio of late eluates (excluding initial eluates) (%) | Surface tension value at 600 s (mN/m) | Un-saturation (mEq/g) |
|---|---|---|---|---|---|---|---|---|
| PX188 | PX(1) | BASF | Kolliphor ® P188 | A | 33.65 | 36.79 | 50.62 | 0.021 |
| PX188 | PX(2) | BASF | Kolliphor ® P188 | B | 6.44 | 6.76 | 52.13 | 0.024 |
| PX188 | PX(3) | BASF | Kolliphor ® P188 | C | 3.32 | 3.47 | 52.23 | 0.032 |
| PX188 | PX(4) | BASF | Kolliphor ® P188 Bio | — | 34.33 | 36.64 | 50.60 | 0.020 |
| PX188 | PX(5) | Merck | EMPROVE ® EXPERT | — | 34.78 | 45.27 | 50.82 | 0.026 |
| PX188 | PX(6) | Merck | EMPROVE ® EXPERT cell culture optimized | — | 0.02 | 0.19 | 52.87 | 0.018 |
| PX188 | PX(7) | NOF CORPORATION | PLONON (R) #188P | — | 19.89 | 20.43 | 51.21 | 0.007 |
| PS80 | PS80 | NOF CORPORATION | Polysorbate 80 (HX2) | — | NA | NA | 38.6 | NA |

As the HPLC system, an Alliance e2695 liquid chromatograph (Waters) mounted with a 2424 evaporative light scattering detector (ELSD) (Waters) was used, and Empower 3 software (Waters) was used for data acquisition and analysis. The column used for separation was a PLRP-S column (1000 Å, 5 μm, 50×2.1 mm; Agilent Technologies), set at a column temperature of 65±5° C. The flow rate was fixed at 0.2 mL/min and a linear gradient was applied using as mobile phases: ultrapure water (Milli-Q water) as mobile phase A and acetonitrile as mobile phase B. Details of the gradient were: 58% B to 64% B (0 to 16.0 min), 64% B to 90% B (16.0 to 18.5 min), fixed at 90% B (18.5 to 21.5 min), 90% B to 100% B (21.5 to 23.5 min), fixed at 100% B (23.5 to 30.0 min), 100% B to 58% B (30.0 to 30.1 min), and fixed at 58% B (30.1 to 40.0 min). The temperature of the ELSD drift tube was 50±25° C., the heating power level of the nebulizer was 75%, the gain value was 250, and the gas pressure was 20 psi. Each PX188 was dissolved in ultrapure water to 0.5 mg/mL, and 20 μL of the PX188 solution was injected into the HPLC system. The eluates after 17 minutes from the start were defined as "late eluates," and the ratio of late eluates was calculated from the chromatogram of each PX188 (FIG. 1) as the ratio (%) of the peak area after 17 minutes to the total peak area. Furthermore, the ratio of the peak area after 17 minutes to the total peak area excluding the peak area up to 1.5 minutes after the start was defined as "late eluates (excluding initial eluates)" and calculated from the chromatogram of each PX188 (FIG. 1).

Furthermore, the mass percent of the molecular species with PPO block lengths of 34 or more, which corresponds to the late eluates, was calculated for five types of PX188. The PPO block length of each eluted peak was calculated assuming the PPO block length of the first eluted peak after 17 minutes to be 34. The molecular weight of the molecular species corresponding to each elution peak was calculated assuming the PEO block length at both ends to be 80. Next, the mass percent of molecular species with PPO block lengths of 34 or more was calculated for each PX188 by multiplying these molecular weights with the elution peak area values to obtain values, and taking the sum of those with PPO block lengths of 34 or more as the numerator, and the sum of all peaks as the denominator, multiplied by 100. The results of calculating the ratios (mass %) of molecular species with PPO block lengths of 34 or more to the total poloxamer are shown in Table 3.

num plate and reached equilibrium after a lapse of 600 seconds from the start of measurement. Therefore, the values at 600 seconds were adopted as the surface tension values of the various surfactant solutions. Although the surface tension value of the PS80 aqueous solution continued to decrease after a lapse of 600 seconds, the surface tension value at 600 seconds was adopted for comparison with the PX188 aqueous solutions.

[Example 3] Correlation Between the Ratio of Late Eluates and Surface Tension Values The correlation between the ratio of late eluates of the seven types of PX188 listed in Table 2 and the surface

TABLE 3

Ratio (mass %) of poloxamers with PPO block length of 34 or more to the total poloxamer

| | | PX(3) | | PX(2) | | PX(7) | | PX(1) | | PX(5) | |
|---|---|---|---|---|---|---|---|---|---|---|---|
| PPO block number | Molecular weight | Area % | Molecular weight * Area | Area % | Molecular weight * Area | Area % | Molecular weight * Area | Area % | Molecular weight * Area | Area % | Molecular weight * Area |
| 16 | 7986 | 4.25 | 33941 | 4.68 | 37374 | 2.67 | 21323 | 8.55 | 68280 | 0 | 0 |
| 17 | 8044 | 0.58 | 4666 | 0.64 | 5148 | 0.05 | 402 | 0.05 | 402 | 23.18 | 186460 |
| 18 | 8102 | 0.77 | 6239 | 0.53 | 4294 | 0.11 | 891 | 0.05 | 405 | 0.08 | 648 |
| 19 | 8160 | 1.5 | 12240 | 0.97 | 7915 | 0.18 | 1469 | 0.13 | 1061 | 0.08 | 653 |
| 20 | 8218 | 2.59 | 21285 | 1.67 | 13724 | 0.37 | 3041 | 0.26 | 2137 | 0.1 | 822 |
| 21 | 8276 | 4.15 | 34345 | 2.84 | 23504 | 0.72 | 5959 | 0.52 | 4304 | 0.17 | 1407 |
| 22 | 8334 | 6.43 | 53588 | 4.32 | 36003 | 1.48 | 12334 | 0.99 | 8251 | 0.28 | 2334 |
| 23 | 8392 | 8.59 | 72087 | 5.97 | 50100 | 2.41 | 20225 | 1.64 | 13763 | 0.55 | 4616 |
| 24 | 8450 | 9.48 | 80106 | 7.85 | 66333 | 3.5 | 29575 | 2.44 | 20618 | 0.97 | 8197 |
| 25 | 8508 | 9.5 | 80826 | 8.8 | 74870 | 4.89 | 41604 | 3.64 | 30969 | 1.44 | 12252 |
| 26 | 8566 | 10.22 | 87545 | 8.97 | 76837 | 6.61 | 56621 | 4.93 | 42230 | 2.2 | 18845 |
| 27 | 8624 | 9.79 | 84429 | 9.63 | 83049 | 8.06 | 69509 | 6.18 | 53296 | 3.17 | 27338 |
| 28 | 8682 | 8.39 | 72842 | 9.47 | 82219 | 9.08 | 78833 | 7.27 | 63118 | 4.05 | 35162 |
| 29 | 8740 | 7.02 | 61355 | 8.26 | 72192 | 9.39 | 82069 | 7.97 | 69658 | 5.25 | 45885 |
| 30 | 8798 | 5.44 | 47861 | 6.95 | 61146 | 9.34 | 82173 | 7.77 | 68360 | 5.87 | 51644 |
| 31 | 8856 | 3.74 | 33121 | 5.3 | 46937 | 8.36 | 74036 | 7.52 | 66597 | 6.19 | 54819 |
| 32 | 8914 | 2.61 | 23266 | 3.95 | 35210 | 7.11 | 63379 | 6.44 | 57406 | 6.1 | 54375 |
| 33 | 8972 | 1.63 | 14624 | 2.77 | 24852 | 5.79 | 51948 | 5.32 | 47731 | 5.55 | 49795 |
| 34 | 9030 | 1.05 | 9482 | 1.84 | 16615 | 4.36 | 39371 | 4.18 | 37745 | 4.77 | 43073 |
| 35 | 9088 | 0.59 | 5362 | 1.13 | 10269 | 3.01 | 27355 | 3.18 | 28900 | 3.95 | 35898 |
| 36 | 9146 | 0.44 | 4024 | 0.76 | 6951 | 2.29 | 20944 | 3.66 | 33474 | 3.24 | 29633 |
| 37 | 9204 | 0.41 | 3774 | 0.75 | 6903 | 2.5 | 23010 | 4.1 | 37736 | 3.79 | 34883 |
| 38 | 9262 | 0.83 | 7687 | 1.97 | 18246 | 2.04 | 18894 | 7.7 | 71317 | 3.92 | 36307 |
| 39 | 9320 | 0 | 0 | 0 | 0 | 5.68 | 52938 | 5.52 | 51446 | 15.11 | 140825 |
| % (w/w) of PX188 with 34 or more PPO blocks | | 3.55 | | 6.85 | | 20.79 | | 29.64 | | 36.61 | |

[Example 2] Measurement of Surface Tension Values of PX188 and PS80

Figure 2:
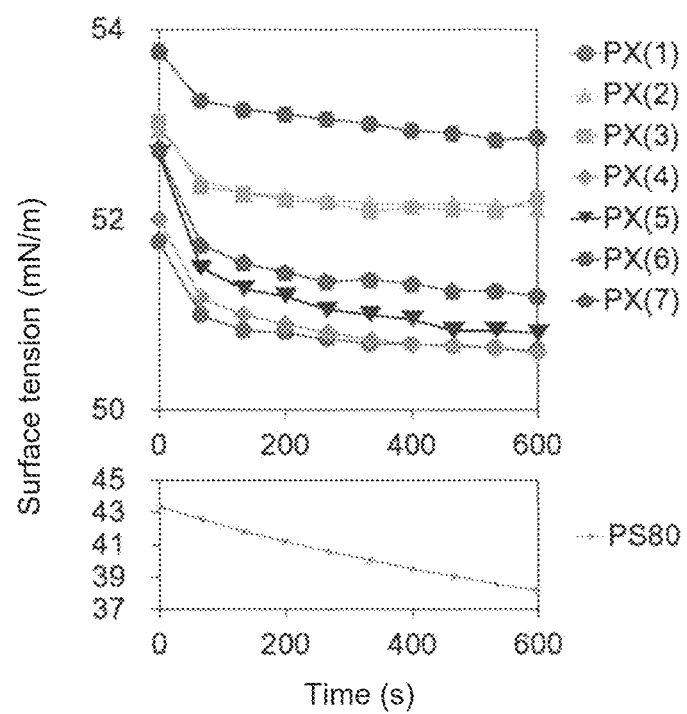
FIG. 2 is a graph showing the results of measuring the surface tension values of seven types of PX188 and one type of PS80.

For the seven types of PX188 and one type of PS80 listed in Table 2, the surface tension values of aqueous solutions of each surfactant dissolved in ultrapure water at 0.5 mg/mL were measured. Measurements by the Wilhelmy method using a surface tensiometer (Force Tensiometer K100C, Kruss) with a platinum plate were performed at 20 to 25 degrees Celsius. As the measurement parameters for the K100C, the detection speed was set to 6 mm/min, the detection sensitivity to 0.005 g, and the immersion depth to 2 mm, and the surface tension values from the start of measurement to 600 seconds were obtained at 60-second intervals (FIG. 2). The glass container containing the surfactant solution in which the platinum plate was immersed was washed a plurality of times with isopropyl alcohol followed by ultrapure water after each measurement. The platinum plate was also washed with isopropyl alcohol, followed by ultrapure water, and then cleaned by making it red hot with an alcohol lamp after each measurement.

Figure 3:
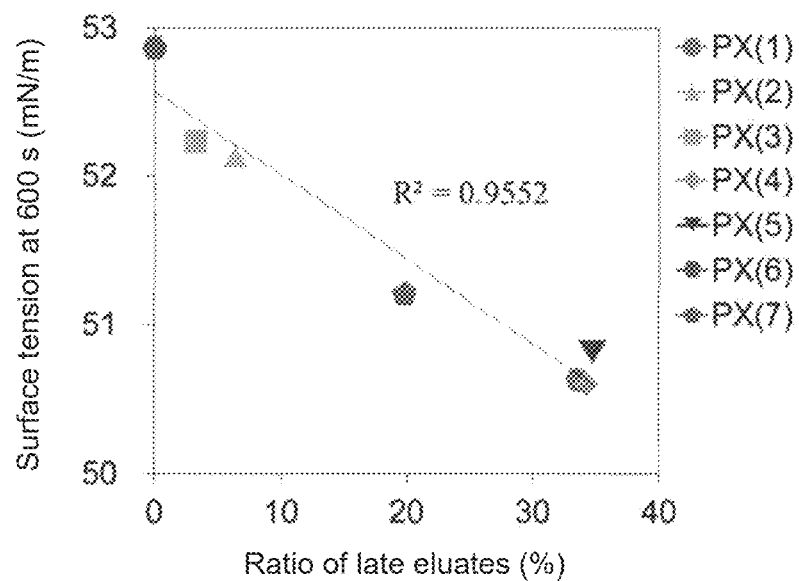
FIG. 3 is a graph showing the correlation between the ratio (%) of late eluates in the components contained in PX188 and the surface tension values.

The surface tension values of the various PX188 aqueous solutions gradually decreased after immersion of the platitension values measured by the above method was analyzed. The results showed that there was a high correlation between those two values (FIG. 3). That is, it was shown that in PX188, the ratio of components with long PPO blocks correlates with the surface tension value, which is an index of the surface activating ability, and furthermore, that the surface tension value decreases when more components with long PPO blocks are contained.

[Example 4] Sample Preparation for Evaluation of Visually Detectable Particles

To investigate the effect of various surfactants on the formation of visually detectable particles, the seven types of PX188 and one type of PS80 listed in Table 2 were used to investigate particle formation in two mAb formulations. The mAbs used were mAb1 (emicizumab, IgG4, anti-coagulation factor IXa/X humanized bispecific monoclonal antibody) and mAb2 (satralizumab, IgG2, pH-dependent binding humanized anti-IL-6 receptor monoclonal antibody) produced and purified by Chugai Pharmaceutical. For the mAb1 sample, an aqueous solution containing 158 mg/mL mAb1, 20 mM histidine, 150 mM arginine, aspartic acid (q.s.), and 0.5 mg/mL PX188 or PS80 was adjusted to pH 6.0, of which 1 mL was filled into vials (3 mL sulfur-treated glass vials, MURASE GLASS). For the mAb2 sample, an aqueous solution containing 123 mg/mL mAb1, 20 mM histidine, 150 mM arginine, aspartic acid (q.s.), and 0.5 mg/mL PX188 or PS80 was adjusted to pH 6.0, of which 1 mL was filled into syringes (1 mL ClearJect, Taisei Kako). For each mAb, eight samples were prepared using each of the eight surfactants listed in Table 2. The samples produced were visually inspected to eliminate samples that contained visible foreign matter during the sample production step.

Ten samples each of mAb1 and mAb2 were provided to a group in which the samples determined to be free of visible foreign matter after visual inspection were visually inspected after being left standing at 25° C. or 40° C. In addition, 20 samples for mAbI and 40 samples for mAb2 were provided to a group that was visually inspected after being left standing at 5° C. and given periodic mechanical stress.

Method for Applying Periodic Mechanical Stress

Figure 4:
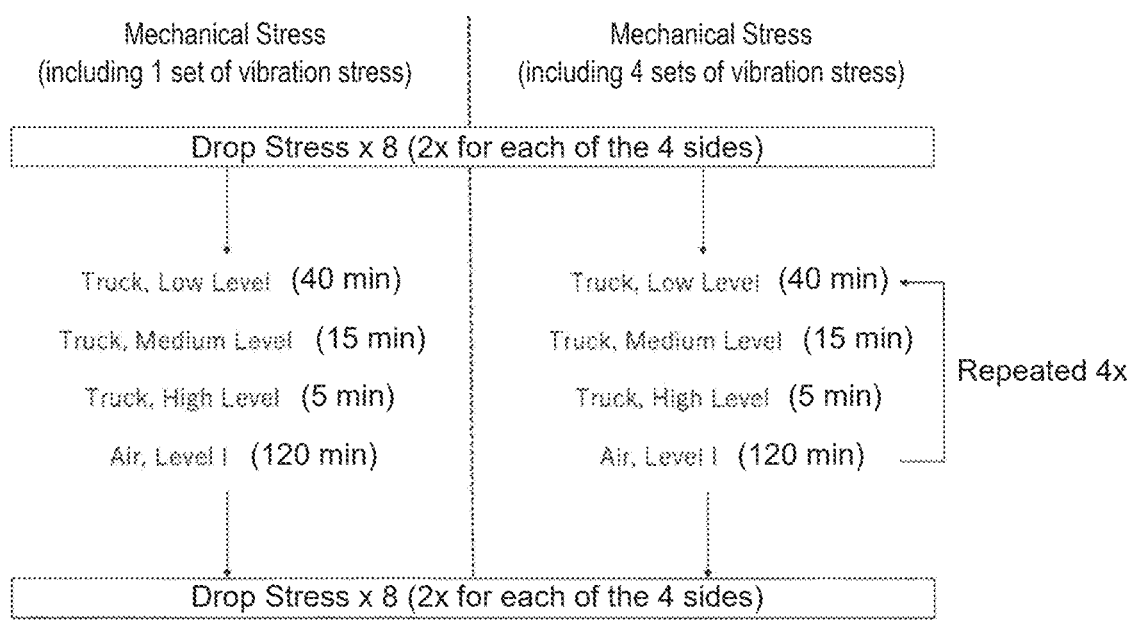
FIG. 4 shows the operations of mechanical stress (including one or four sets of vibration stress).
Figure 5:
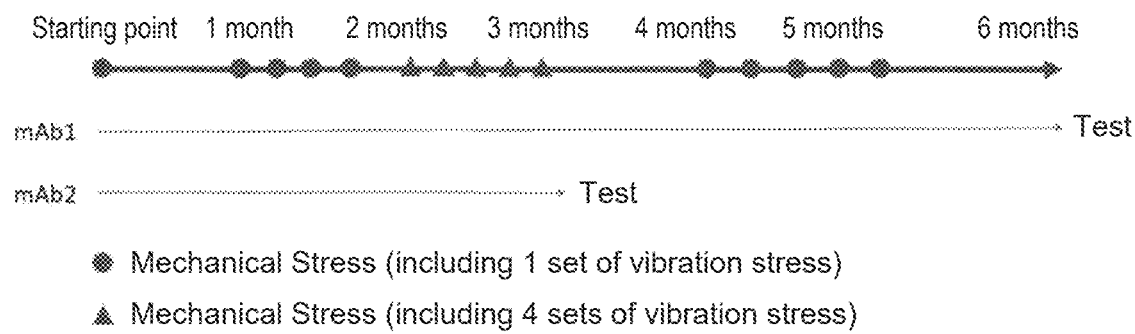
FIG. 5 shows the operations for applying mechanical stress.
Figure 6:
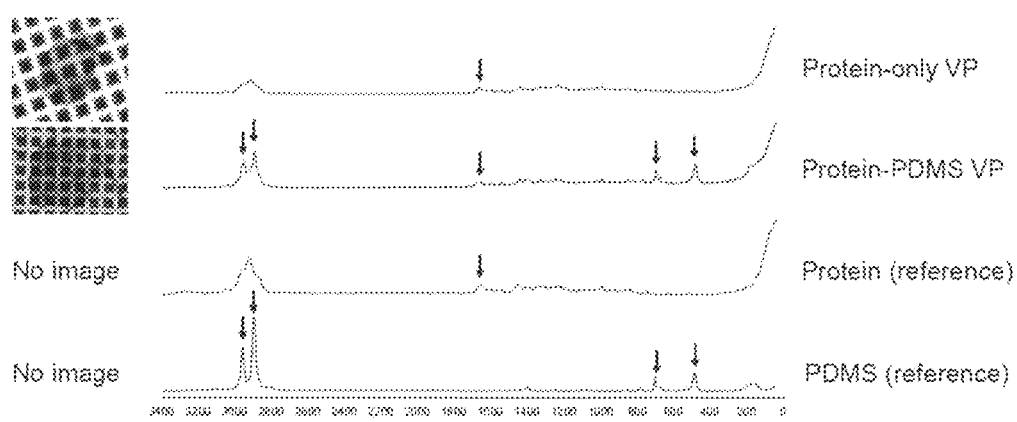
FIG. 6 shows the Raman spectra of a typical particle consisting only of protein (Protein-only) and a particle consisting of a complex of protein and polydimethylsiloxane (PDMS) (Protein-PDMS).

The sample group given periodic mechanical stress was left standing and stored at 5° C. except when mechanical stress was applied at room temperature. Stress combining the following drop test and vibration test (drop test→vibration test→drop test) was performed by referring to ASTM D4169 with the container properly packaged to prevent damage. For the drop stress, one set of drop tests consisted of dropping samples twice from a height of 38.1 cm with one side facing down for each of the four sides so that the stress applied to each sample was uniform, using a drop test apparatus (PDT-56ED, Lansmont). One set of these drop tests was performed before and after the vibration test. For the vibration stress, one set of vibration tests consisted of applying vibration stress at four different intensities (Truck Low Level 40 minutes, Truck Medium Level 15 minutes, Truck High Level 5 minutes, and Air Level 1120 minutes) using a vibration test apparatus (D-5900, Shinken). As shown in FIG. 4, there were cases where only one set of vibration tests was given, and cases where four sets were given in succession, and their timing is shown in FIG. 6.

[Example 5] Particle Formation when Left to Stand at 25° C.

Visual inspection was performed on samples after being left to stand and stored for 6 months at 25° C. according to the visual inspection methods 1 and 2. For particles detected by visual inspection, identification of their composition by Raman spectroscopy was performed using a Raman imaging microscope (DXR2xi, Thermo scientific) according to the method for identifying the composition of visually detectable particles by Raman spectroscopy.

Visual Inspection Method 1 (Vial; mAb1)

A visual inspection table (EM-M102-06, Hitachi Industry & Control Solutions) was used for the visual inspection of the vials. The outside of the vials was cleaned and the number of vials containing visually detectable particles in the filled drug solution was counted by the naked eye with a black background and at an illuminance of about 20,000 1×.

Visual Inspection Method 2 (Syringe; mAb2)

Fluorescent light was used for the visual inspection of the syringes. The outside of the syringes was cleaned and the number of syringes containing visually detectable particles in the filled drug solution was counted by the naked eye with a black background and at an illuminance of about 10,000 1×.

Method for Identifying Particle Composition by Raman Spectroscopy

The particles were collected on a nickel filter with a pore size of 3 mm (Tokyo Process Service), and the Raman spectra when irradiating them with a 532 nm laser were obtained using a Raman imaging microscope (DXR2xi, Thermo scientific) to confirm that they were endogenous proteinaceous particles. The spectra were obtained by using a lens with a 10× or 50× magnification and setting the values of laser intensity (5.0 to 10.0 mW), exposure time (0.05 to 1.0 s), and number of exposures (15 to 35) within the ranges described to obtain appropriate spectra that would allow to determine the composition. Since the typical proteinaceous particles were particles consisting of protein alone and particles consisting of a complex of protein and polydimethylsiloxane (PDMS), examples of their Raman spectra are shown in FIG. 6.

The number of containers that contained proteinaceous particles was counted for the samples left to stand and stored for 6 months at 25° C. and is shown in Table 4. Both mAb1 and mAb2 were shown to have different rates of particle formation depending on the type of surfactant contained in the formulation.

TABLE 4

Number of visually detectable particles generated in mAb1 and mAb2 formulations under static conditions at 25° C.

| | mAb1 | | | mAb2 | | |
|---|---|---|---|---|---|---|
| Formulation | Protein-only VPs (1) | Protein-PDMS VPs (2) | Proteinaceous VPs (1) + (2) | Protein-only VPs (1) | Protein-PDMS VPs (2) | Proteinaceous VPs (1) + (2) |
| PX(1) | 0/10 | 0/10 | 0/10 | 0/10 | 0/10 | 0/10 |
| PX(2) | 1/10 | 2/10 | 3/10 | 0/10 | 1/10 | 1/10 |
| PX(3) | 2/10 | 2/10 | 4/10 | 0/10 | 0/10 | 0/10 |
| PX(4) | 0/10 | 0/10 | 0/10 | 0/10 | 0/10 | 0/10 |
| PX(5) | 1/10 | 0/10 | 1/10 | 0/10 | 0/10 | 0/10 |
| PX(6) | 0/10 | 5/10 | 5/10 | 0/10 | 2/10 | 2/10 |
| PX(7) | 0/10 | 1/10 | 1/10 | 0/10 | 0/10 | 0/10 |
| PS80 | 0/10 | 0/10 | 0/10 | 0/10 | 0/10 | 0/10 |

*(Number of formulations in which visually detectable particles were generated)/(total number of formulations subjected to the test) is shown. The total number of formulations containing visually detectable particles consisting of protein alone (Protein-only VPs) and visually detectable particles consisting of a complex of protein and polydimethylsiloxane (Protein-PDMS VPs) is shown as the number of formulations containing proteinaceous visually detectable particles (Proteinaceous VPs).

[Example 6] Particle Formation after being Left to Stand at 40° C.

Visual inspection was performed on samples after being left to stand and stored for 6 months at 40° C. according to the visual inspection methods 1 and 2. For particles detected by visual inspection, identification of their composition by Raman spectroscopy was performed using a Raman imaging microscope (DXR2xi, Thermo scientific) according to the method for identifying the composition of particles by Raman spectroscopy.

The number of containers that contained proteinaceous particles was counted for the samples left to stand and stored for 6 months at 40° C. and is shown in Table 5. Both mAb1 and mAb2 were shown to have highly different rates of particle formation depending on the type of surfactant contained in the formulation.

TABLE 5

Number of visually detectable particles generated in mAb1 and mAb2 formulations under static conditions at 40° C.

| | mAb1 | | | mAb2 | | |
|---|---|---|---|---|---|---|
| Formulation | Protein-only VPs (1) | Protein-PDMS VPs (2) | Proteinaceous VPs (1) + (2) | Protein-only VPs (1) | Protein-PDMS VPs (2) | Proteinaceous VPs (1) + (2) |
| PX(1) | 0/10 | 0/10 | 0/10 | 1/10 | 1/10 | 2/10 |
| PX(2) | 1/10 | 0/10 | 1/10 | 1/10 | 4/10 | 5/10 |
| PX(3) | 1/10 | 2/10 | 3/10 | 0/10 | 7/10 | 7/10 |
| PX(4) | 0/10 | 0/10 | 0/10 | 0/10 | 1/10 | 1/10 |
| PX(5) | 0/10 | 0/10 | 0/10 | 0/10 | 3/10 | 3/10 |
| PX(6) | 0/10 | 9/10 | 9/10 | 1/10 | 7/10 | 8/10 |
| PX(7) | 0/10 | 0/10 | 0/10 | 0/10 | 2/10 | 2/10 |
| PS80 | 1/10 | 0/10 | 1/10 | 1/10 | 0/10 | 1/10 |

*(Number of formulations in which visually detectable particles were generated)/(total number of formulations subjected to the test) is shown. The total number of formulations containing visually detectable particles consisting of protein alone (Protein-only VPs) and visually detectable particles consisting of a complex of protein and polydimethylsiloxane (Protein-PDMS VPs) is shown as the number of formulations containing proteinaceous visually detectable particles (Proteinaceous VPs).

[Example 7] Particle Formation Under 5° C. Static and Periodic Mechanical Stress Conditions Visual inspection was performed on samples subjected to static storage at 5° C. and periodic drop and vibration stress (samples obtained after 6 months for mAb1 and after 3 months for mAb2) according to the visual inspection methods 1 and 2. For particles detected by visual inspection, identification of their composition by Raman spectroscopy was performed using a Raman imaging microscope (DXR2xi, Thermo scientific) according to the method for identifying particle composition by Raman spectroscopy.

The number of containers that contained proteinaceous particles was counted for the samples subjected to static storage at 5° C. and periodic mechanical stress and is shown in Table 6.

TABLE 6

Number of visually detectable particles generated in mAb1 and mAb2 formulations under 5° C. static and periodic drop and vibration stress conditions

| | mAb1 | | | mAb2 | | |
|---|---|---|---|---|---|---|
| Formulation | Protein-only VPs (1) | Protein-PDMS VPs (2) | Proteinaceous VPs (1) + (2) | Protein-only VPs (1) | Protein-PDMS VPs (2) | Proteinaceous VPs (1) + (2) |
| PX(1) | 0/20 | 0/20 | 0/20 | 2/40 | 0/40 | 2/40 |
| PX(2) | 2/20 | 0/20 | 2/20 | 5/40 | 0/40 | 5/40 |
| PX(3) | 1/20 | 1/20 | 2/20 | 9/40 | 0/40 | 9/40 |
| PX(4) | 0/20 | 0/20 | 0/20 | 3/40 | 0/40 | 3/40 |
| PX(5) | 2/20 | 0/20 | 2/20 | 3/40 | 0/40 | 3/40 |
| PX(6) | 1/20 | 0/20 | 1/20 | 4/40 | 1/40 | 5/40 |
| PX(7) | 0/20 | 0/20 | 0/20 | 0/40 | 0/40 | 0/40 |
| PS80 | 0/20 | 0/20 | 0/20 | 0/40 | 0/40 | 0/40 |

*(Number of formulations in which visually detectable particles were generated)/(total number of formulations subjected to the test) is shown. The total number of formulations containing visually detectable particles consisting of protein alone (Protein-only VPs) and visually detectable particles consisting of a complex of protein and polydimethylsiloxane (Protein-PDMS VPs) is shown as the number of formulations containing proteinaceous visually detectable particles (Proteinaceous VPs).

For mAb2, the rate of particle formation was shown to vary greatly depending on the type of surfactant contained in the formulation. For mAb1, the rate of particle formation was not high enough, and therefore was not used in subsequent analyses.

[Example 8] Analysis of Correlation of Particle Formation Rate with Ratio of Late Eluates of PX188 and Surface Tension Value of Surfactant Aqueous Solution A correlation analysis was performed to demonstrate the correlation between the ratio of late eluates of the seven types of PX188 listed in Table 2 and the rate of particle formation. The particle formation rate (%) was calculated for each sample by dividing the number of containers in which particles were formed by the total number of containers subjected to the test and multiplying by 100. In addition, since the static storage conditions at 25° C. and the static storage conditions at 40° C. are both stresses caused by a rise in temperature and the composition of the proteinaceous particles formed was mostly composed of complexes of protein and polydimethylsiloxane, it was considered that the particles were formed according to an equivalent pathway of particle formation and the particle formation rate (%) was thus calculated by adding them up as heat stress conditions. For those subjected to static storage at 5° C. and periodic mechanical stress, insoluble foreign matter consisting of protein alone constituted the majority, which was considered to be formed according to a different particle formation pathway than that of the heat stress conditions, and they were therefore analyzed separately as mechanical stress conditions.

Figure 7:
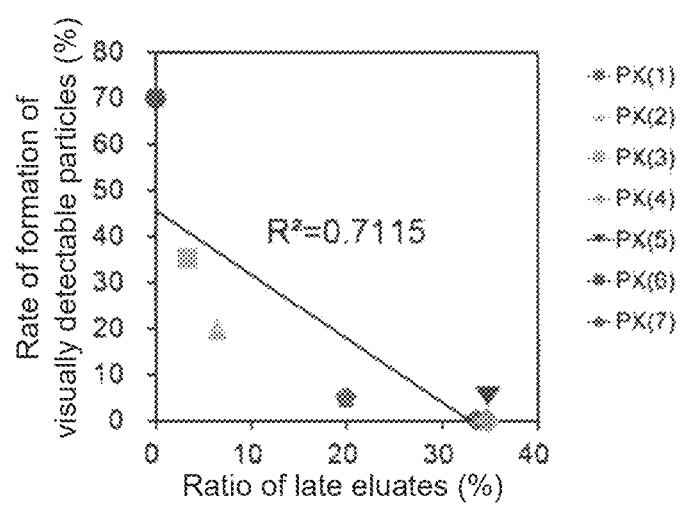
FIG. 7 is a graph showing the correlation between the ratio of late eluates of PX188 and the rate of particle formation under heat stress conditions for mAb1.
Figure 8:
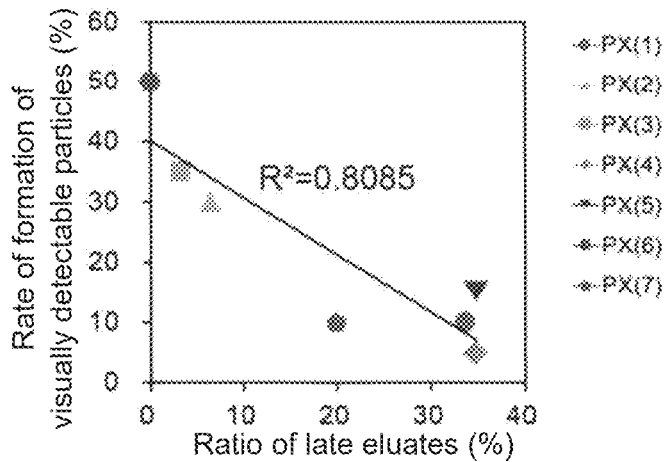
FIG. 8 is a graph showing the correlation between the ratio of late eluates of PX188 and the rate of formation of visually detectable particles under heat stress conditions for mAb2.
Figure 9:
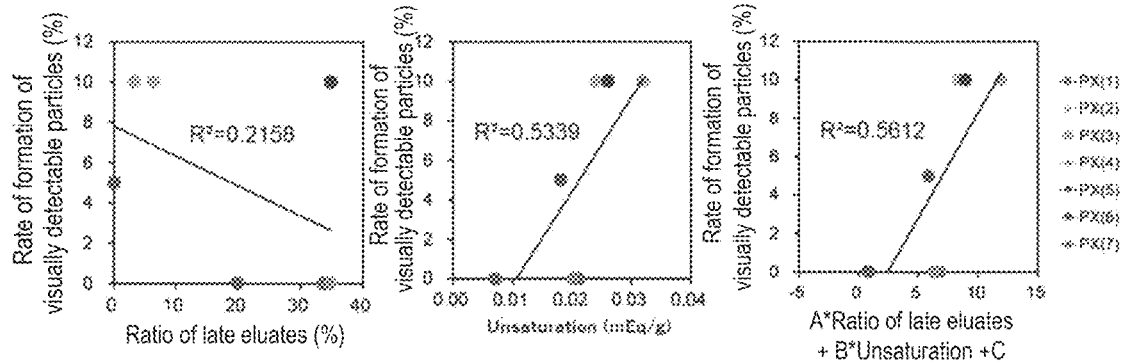
FIG. 9 is a graph showing the correlation between the rate of formation of visually detectable particles under mechanical stress conditions for mAb1, and the ratio (%) of late eluates, unsaturation, and synthetic variables of PX188, respectively.
Figure 10:
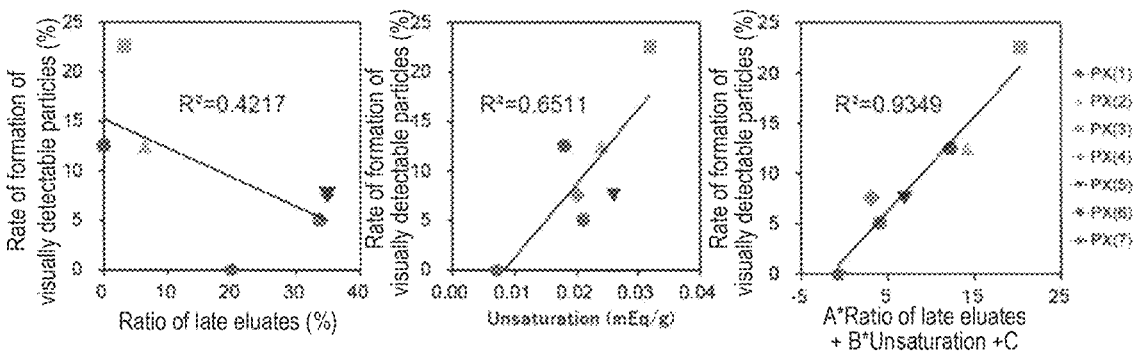
FIG. 10 is a graph showing the correlation between the rate of formation of visually detectable particles under mechanical stress conditions for mAb2, and the ratio of late eluates, unsaturation, and synthetic variables of PX188, respectively.

As a result, a correlation was observed between the ratio of late eluates and the rate of particle formation under heat stress conditions for mAb1 (FIG. 7). A correlation was also observed between the ratio of late eluates and the rate of particle formation under heat stress conditions and mechanical stress conditions for mAb2 (FIG. 8 and left figure of FIG. 10). A weak correlation was observed under mechanical stress conditions for mAb1 (left figure of FIG. 9).

This correlation chart indicates that the higher the value of the ratio of late eluates, i.e., the more PX188 species with long PPO blocks are used, the more particle formation can be reduced in the mAb1 and mAb2 formulations. Since the value of the ratio of late eluates correlates well with the value of surface tension, as shown in Example 3, this can also be rephrased as: the formation of particles in mAb1 and mAb2 formulations can be reduced by using a surfactant that can lower the surface tension value. It has been demonstrated that this does not depend on the surfactant species, as even with PS80, which is a different surfactant species than PX188, the surface tension value of the PS80 aqueous solution was low and the rate of particle production was low. In addition, results were obtained where the rate of particle formation was significantly different with surface tension values in the range of 50 to 53 mN/m, which suggests that there is a threshold in this range for the increase and decrease of particle formation in the mAb1 and mAb2 formulations.

[Example 9] Analysis of Correlation Between the Degree of Unsaturation of PX188 and Particle Formation Rate Under mechanical stress conditions, the correlation of the rate of particle formation not only with the ratio of late eluates but also with the degree of unsaturation was analyzed. As a result, a certain degree of correlation was observed such that the lower the degree of unsaturation, i.e., the less diblock compounds (PEO-PPO compounds) in the product, the lower the rate of particle formation (middle figure in FIG. 9 and middle figure in FIG. 10). In particular, for PX(7), which shows a degree of unsaturation below the lower limit of the current USP standard for unsaturation of PX188 (0.018 mEq/g), the formation of proteinaceous foreign matter was completely suppressed for both mAb1 and mAb2.

In addition, when a multiple regression analysis was performed using two parameters, the ratio of late eluates and the degree of unsaturation, an increase in the correlation coefficient was observed, the extent of which was particularly significant for mAb2. (right figure of FIG. 9 and right figure of FIG. 10)

[Example 10] Evaluation of HMWS Generated in Each Formulation

To evaluate the effect of surfactant species on the formation of aggregates derived from antibodies (High Molecular Weight Species: HMWS) in the formulation, the amount of HMWS generated in the formulations using the seven types of PX188 and one type of PS80 listed in Table 2 was evaluated by size exclusion chromatography. Evaluations were conducted for the conditions of 5° C. static, 25° C. static, 40° C. static, and 5° C. static storage with application of periodic mechanical stress, each before, 3 months after, and 6 months after storage. However, since no visual evaluation was performed at 6 months under the conditions of 5° C. static storage with application of periodic drop and vibration for mAb2, and HMWS evaluation was also not performed.

As the HPLC system, an Alliance 2695 liquid chromatograph (Waters) mounted with a 2489 UV/Visible detector (Waters) was used, and Empower 3 software (Waters) was used for data acquisition and analysis. The column used for separation was a TSKgel G3000SWXL column (250 Å, 5 μm, 300×7.8 mm; Tosoh), set at a column temperature of 25±5° C. The flow rate was fixed at 0.2 mL/min, 50 mM $NaH_2PO_4/Na_2HPO_4$, 300 mM NaCl and 0.5 mg/mL $NaN_3$ (pH 7.0) were used as the mobile phase, and the flow rate was fixed at 0.5 mL/min. Each antibody solution was diluted with the mobile phase solution to an antibody concentration of 1 mg/mL, of which 60 μL was injected into the HPLC system. The HMWS % value was defined as the ratio of the HMWS peak area appearing in the vicinity of 14.5 min to the total peak area within the peak area integration range (10 to 24 min), and was calculated from the chromatogram of each sample.

The calculated HMWS values are shown in Table 7.

TABLE 7

| | | | 5° C. | | 25° C. | | 40° C. | | 5° C.+ | |
|---|---|---|---|---|---|---|---|---|---|---|
| mAb | Formulation | Starting point | 3 months | 6 months | 3 months | 6 months | 3 months | 6 months | 3 months | 6 months |
| mAb1 | PX(1) | 0.1 | 0.2 | 0.2 | 0.3 | 0.4 | 1.3 | 3.0 | 0.2 | 0.2 |
| | PX(2) | 0.0 | 0.2 | 0.2 | 0.3 | 0.4 | 1.4 | 3.3 | 0.2 | 0.2 |
| | PX(3) | 0.0 | 0.2 | 0.1 | 0.3 | 0.4 | 1.4 | 3.5 | 0.2 | 0.2 |
| | PX(4) | 0.0 | 0.2 | 0.2 | 0.3 | 0.4 | 1.4 | 3.5 | 0.2 | 0.2 |
| | PX(5) | 0.0 | 0.2 | 0.2 | 0.3 | 0.4 | 1.4 | 3.5 | 0.2 | 0.2 |
| | PX(6) | 0.0 | 0.2 | 0.2 | 0.3 | 0.4 | 1.3 | 3.5 | 0.2 | 0.2 |
| | PX(7) | 0.1 | 0.2 | 0.1 | 0.3 | 0.4 | 1.4 | 3.5 | 0.2 | 0.2 |
| | PS80 | 0.1 | 0.2 | 0.1 | 0.3 | 0.3 | 1.2 | 2.9 | 0.2 | 0.2 |
| mAb2 | PX(1) | 0.3 | 0.3 | 0.4 | 0.7 | 0.8 | 2.2 | 4.8 | 0.4 | — |
| | PX(2) | 0.3 | 0.4 | 0.4 | 0.6 | 0.8 | 2.3 | 4.6 | 0.4 | |
| | PX(3) | 0.3 | 0.4 | 0.4 | 0.6 | 0.8 | 2.1 | 4.9 | 0.4 | |
| | PX(4) | 0.3 | 0.4 | 0.4 | 0.6 | 0.8 | 2.0 | 5.3 | 0.4 | |
| | PX(5) | 0.3 | 0.4 | 0.4 | 0.7 | 0.8 | 2.2 | 5.3 | 0.4 | |
| | PX(6) | 0.3 | 0.4 | 0.4 | 0.6 | 0.8 | 1.9 | 5.3 | 0.4 | |
| | PX(7) | 0.3 | 0.3 | 0.4 | 0.6 | 0.8 | 1.8 | 5.3 | 0.4 | |
| | PS80 | 0.3 | 0.3 | 0.3 | 0.8 | 0.6 | 1.2 | 2.6 | 0.4 | |

Amount of HMWS generated in mAb1 and mAb2 formulations

Figure 11:
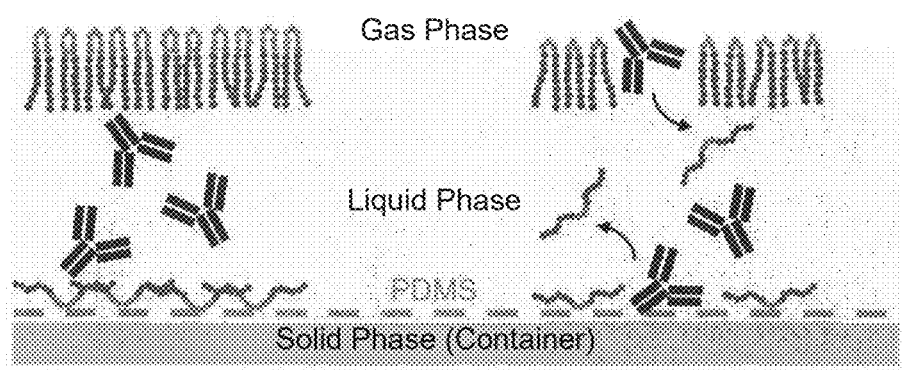
FIG. 11 is an image of antibody protection by interfacial adsorption of PX188.

The 5° C. static conditions and the 5° C. static storage conditions with application of periodic mechanical stress showed almost equivalent amounts of HMWS, and no significant increase in HMWS or differences between samples were observed. An increase in the amount of HMWS was observed under 25° C. static conditions and 40° C. static conditions compared to 5° C. static conditions, but no significant differences between the samples were observed. Under heat stress conditions, PS80 showed slightly lower values than the PX188 sample group, but there was no significant difference in the rate of particle formation compared to the PX188 with relatively low surface tension values (e.g., PX(1) and PX(4)), suggesting that the amount of HMWS generated does not play a role in the reduction of particle formation in the mAb1 and mAb2 formulations, and furthermore, that the protective ability of the various surfactants from the gas-liquid interface, container surface, and silicone oil (PDMS) surface stresses are influencing the particle formation rate (FIG. 11). The left side of FIG. 11 shows an image of a case where the interface is adequately protected by the surfactant, and the right side of FIG. 9 shows an image of a case where the protection is inadequate.

[Example 11] Measurement of Surface Tension Values of Low Concentration PX188

Figure 12:
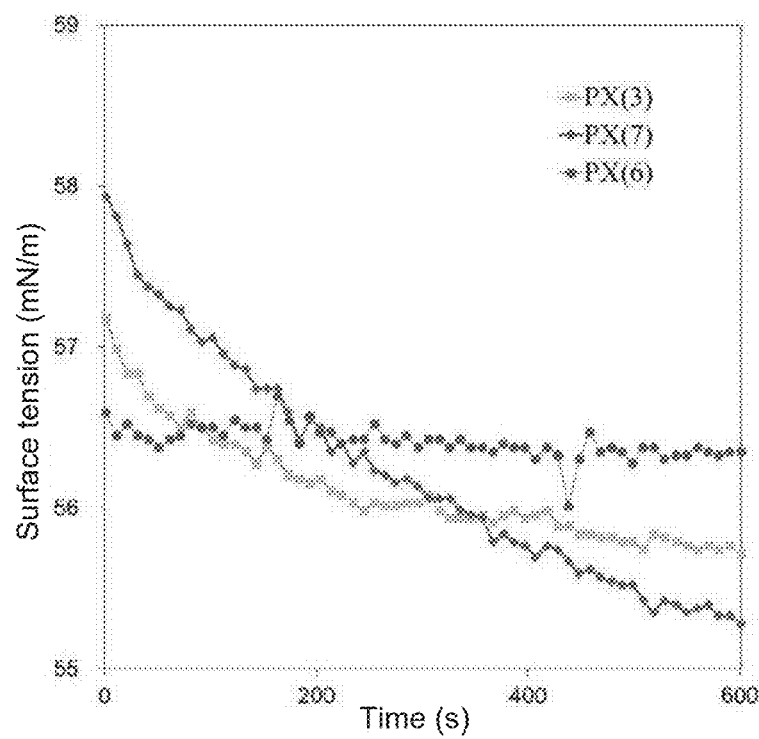
FIG. 12 is a graph of the surface tension values of PX188.

Of the seven types of PX188 listed in Table 2, the surface tension values of aqueous solutions of each surfactant dissolved in ultrapure water at 0.01 mg/mL were measured for PX(3), PX(6) and PX(7). Measurements by the Wilhelmy method using a surface tensiometer (Force Tensiometer K100C, Kruss) with a platinum plate were performed at 20 to 25° C. As the measurement parameters for the K100C, the detection speed was set to 6 mm/min, the detection sensitivity to 0.005 g, and the immersion depth to 2 mm, and the surface tension values from the start of measurement to 600 seconds were obtained at 10-second intervals (FIG. 12). The glass container containing the surfactant solution in which the platinum plate was immersed was washed a plurality of times with isopropyl alcohol followed by ultrapure water after each measurement. The platinum plate was also washed with isopropyl alcohol, followed by ultrapure water, and then cleaned by making it red hot with an alcohol lamp after each measurement.

The surface tension values of the various PX188 aqueous solutions exhibited a similar behavior as when the surface tension values of aqueous solutions of PX188 dissolved in ultrapure water at 0.5 mg/mL were measured, and therefore the values at 600 seconds (55.7 mN/m for PX(3), 56.4 mN/m for PX(6), and 55.3 mN/m for PX(7)) were adopted as the surface tension values of the various surfactant solutions. The degree of differences in the surface tension values of PX188 measured here at 600 seconds were similar to Example 2, and the difference in surface activating ability of each PX188 could be evaluated even when the PX188 concentration was lower than 0.5 mg/mL.

Figure 13:
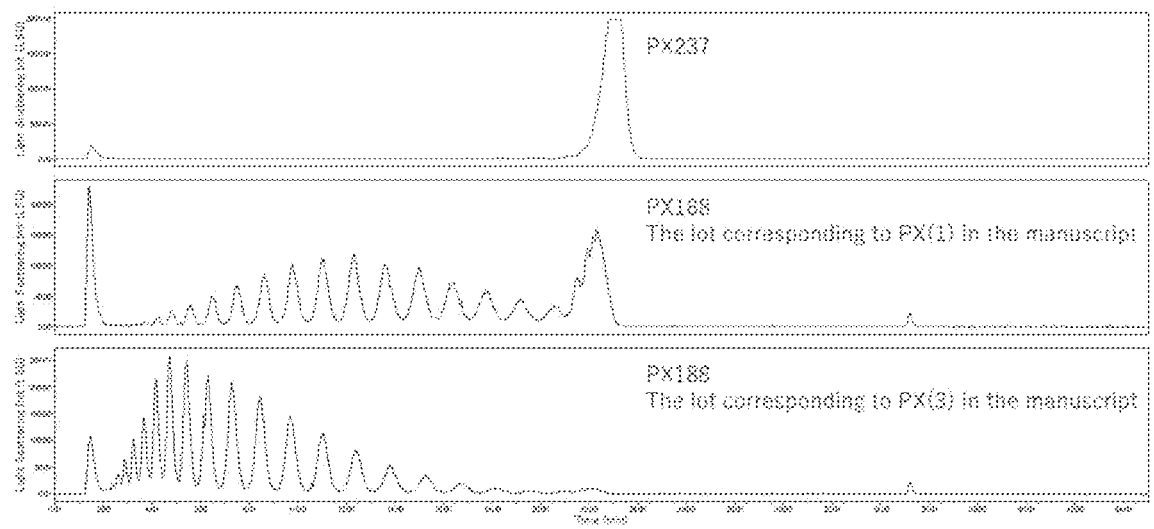
FIG. 13 shows the results of the component analysis of PX237 by reversed-phase chromatography.

[Example 12] Component Analysis of Poloxamer 237 (PX237) by Reversed-Phase Chromatography The results of the component analysis of poloxamer 237 (PX237) by reversed-phase chromatography, using the same procedure as in Example 1, are shown in FIG. 13 below. For PX237, it was shown that all peaks appear after 17 minutes except for the peak area up to 1.5 minutes after the start.

[Example 13] Measurement of Surface Tension Values of PX237

Figure 14:
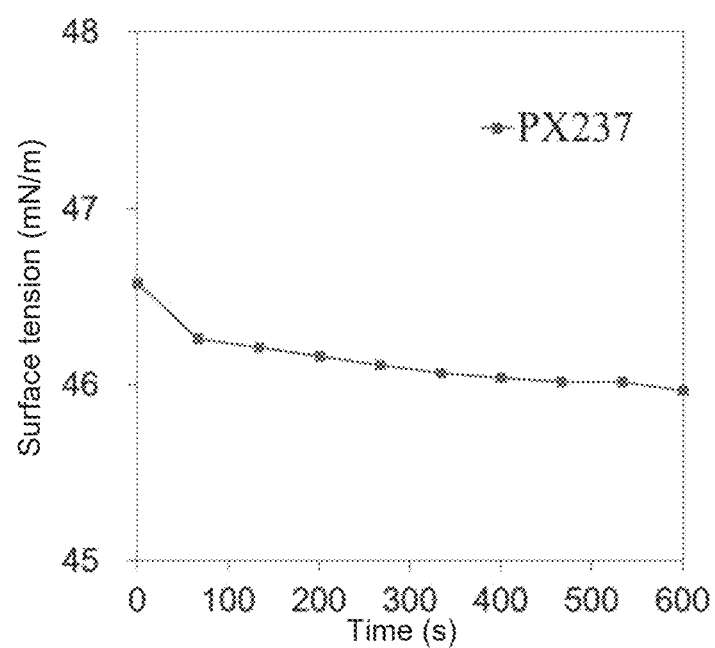
FIG. 14 is a graph showing the results of measuring the surface tension values of PX237.

The surface tension values of an aqueous solution of PX237 dissolved in ultrapure water (Milli-Q water) to 0.05 mg/mL were measured. Measurements by the Wilhelmy method using a surface tensiometer (Force Tensiometer K100C, Kruss) with a platinum plate were performed at 20 to 25° C. As the measurement parameters for the K100C, the detection speed was set to 6 mm/min, the detection sensitivity to 0.005 g, and the immersion depth to 2 mm, and the surface tension values from the start of measurement to 600 seconds were obtained at 60-second intervals (FIG. 14). The glass container containing the surfactant solution in which the platinum plate was immersed was washed a plurality of times with isopropyl alcohol followed by ultrapure water after each measurement. The platinum plate was also washed with isopropyl alcohol, followed by ultrapure water, and then cleaned by making it red hot with an alcohol lamp after each measurement.

The surface tension values of the 0.5 mg/mL PX237 aqueous solution exhibited a similar behavior as when the surface tension values of aqueous solutions of PX188 dissolved in ultrapure water at 0.5 mg/mL were measured, and therefore the value at 600 seconds (45.9 mN/m) was adopted as the surface tension value of the PX237 aqueous solution. The surface tension value of the 0.5 mg/mL PX188 aqueous solution and the value at 600 seconds were adopted. The surface tension values of the PX237 aqueous solution were lower than the surface tension values of any of the PX188 aqueous solutions listed in Table 2, which allowed to evaluate that the surface activating ability of PX237 is higher than that of PX188.

[Example 14] Sample Preparation for Evaluation of Visually Detectable Particles

To investigate the effect of PX237 on the formation of visually detectable particles, PX237 and as a control, PX(3) of the PX188s listed in Table 2 were used to investigate particle formation in one mAb formulation. The mAb used was mAb1 (emicizumab, IgG4, anti-coagulation factor IXa/X humanized bispecific monoclonal antibody) manufactured and purified by Chugai Pharmaceutical. For the mAb1 sample, an aqueous solution containing 150 mg/mL mAb1, 20 mM histidine, 150 mM arginine, aspartic acid (q.s.), and 0.5 mg/mL PX188 or PX237 was adjusted to pH 6.0, of which 1 mL was filled into vials (3 mL sulfur-treated glass vials, MURASE GLASS). The samples produced were visually inspected to eliminate samples that contained visible foreign matter during the sample production step.

Sixty vials of mAb1 for each sample were provided to a group in which the samples determined to be free of visible foreign matter after visual inspection were visually inspected after being left standing at 25° C.

[Example 15] Particle Formation when Left to Stand at 25° C.

Visual inspection was performed on samples after being left to stand and stored for 6 months at 25° C. according to the visual inspection method 1. For particles detected by visual inspection, identification of their composition by Raman spectroscopy was performed using a Raman imaging microscope (DXR2xi, Thermo scientific) according to the method for identifying the composition of visually detectable particles by Raman spectroscopy.

The number of containers that contained proteinaceous particles was counted for the samples left to stand and stored for 6 months at 25° C. and is shown in Table 8. It was shown that when the surfactant contained in the formulation was PX237, the rate of particle formation was lower than that of PX (3).

TABLE 8

|  | Initial | After 6 months at 25° C. |
|---|---|---|
| mAb1 prepared with PX(3) | 0/60 | 5/60 (Protein-PDMS VP) |
| mAb1 prepared with PX237 | 0/60 | 0/60 |

The invention claimed is:

1. A pharmaceutical formulation comprising an aqueous solution comprising:
a monoclonal antibody selected from (i) an antibody comprising an H chain comprising SEQ ID NO: 1, an H chain comprising SEQ ID NO: 2, and two L chains, each comprising SEQ ID NO: 3; and (ii) an antibody comprising two H chains, each comprising SEQ ID NO: 4, and two L chains, each comprising SEQ ID NO: 5, and
polyoxyethylene polyoxypropylene glycol (poloxamer), wherein the poloxamer is represented by formula I:

$$HO(C_2H_4O)_a(C_3H_6O)_b(C_2H_4O)_cH \qquad (I)$$

wherein
a and c are independently a number selected from 75 to 85;
b is a number selected from 22 to 33; and
a, b and c are average values over the entire poloxamer, and
the peak area after an elution time of 17 minutes is 19% or more of the total peak area in high performance liquid chromatography of the poloxamer under the high-performance liquid chromatography conditions defined below:
(1) Column: HPLC column packed with macroporous styrene divinylbenzene (1000 Å, 5 μm, 50 ×2.1 mm)
(2) Mobile phase:
Mobile phase A: Ultrapure water
Mobile phase B: Acetonitrile
(3) Elution gradient program
From 0 minute to 16.0 minutes: Mobile phase B 58% to 64%
From 16.0 minutes to 18.5 minutes: Mobile phase B 64% to 90%
From 18.5 minutes to 21.5 minutes: Mobile phase B fixed at 90%
From 21.5 minutes to 23.5 minutes: Mobile phase B 90% to 100%
From 23.5 minutes to 30.0 minutes: Mobile phase B fixed at 100%
From 30.0 minutes to 30.1 minutes: Mobile phase B 100% to 58%
From 30.1 minutes to 40.0 minutes: Mobile phase B fixed at 58%
(4) Flow rate: 0.2 mL/min
(5) Detection method: Evaporative light scattering detection (drift tube temperature: 50+25° C., nebulizer heating power level: 75%, gain value: 250, gas pressure: 20 psi)
(6) Column temperature: 65±5° C.
(7) Poloxamer concentration (in ultrapure water) as applied to the column: 0.5 mg/mL.

2. The pharmaceutical formulation of claim 1, wherein the peak area after an elution time of 17 minutes is 33% or more of the total peak area.

3. The pharmaceutical formulation of claim 1, wherein b is a number selected from 25 to 30.

4. The pharmaceutical formulation of claim 1, wherein the HPLC column packed with macroporous styrene divinylbenzene is a PLRP-S column.

5. The pharmaceutical formulation of claim 1, wherein the number-average molecular weight of the poloxamer is in the range of 7680 to 9510.

6. The pharmaceutical formulation of claim 1, wherein the concentration of the poloxamer in the aqueous solution is 0.001 to 100 mg/mL.

7. The pharmaceutical formulation according to claim 1, wherein the concentration of the antibody in the aqueous solution is 10 to 300 mg/mL.

8. The pharmaceutical formulation according to claim 1, wherein the aqueous solution comprises one or more pharmaceutically acceptable excipients selected from sugars, sugar alcohols, buffering agents, preservatives, carriers, antioxidants, chelating agents, natural polymers, synthetic polymers, cryoprotectants, extenders, and stabilizers.

9. The pharmaceutical formulation according to claim 1, wherein the poloxamer is poloxamer 188.

10. The pharmaceutical formulation of claim 1, wherein the monoclonal antibody comprises an H chain comprising SEQ ID NO: 1, an H chain comprising SEQ ID NO: 2, and two L chains, each comprising SEQ ID NO: 3.

11. The pharmaceutical formulation of claim 1, wherein the monoclonal antibody comprises two H chains, each comprising SEQ ID NO: 4, and two L chains, each comprising SEQ ID NO: 5.

* * * * *

SEQUENCE LISTING

```
Sequence total quantity: 5
SEQ ID NO: 1            moltype = AA  length = 448
FEATURE                 Location/Qualifiers
REGION                  1..448
                        note = artificial sequence
source                  1..448
                        mol_type = protein
                        organism = synthetic construct
SEQUENCE: 1
QVQLVESGGG LVQPGGSLRL SCAASGFTFS YYDIQWVRQA PGKGLEWVSS ISPSGQSTYY    60
RREVKGRFTI SRDNSKNTLY LQMNSLRAED TAVYYCARRT GREYGGGWYF DYWGQGTLVT   120
VSSASTKGPS VFPLAPCSRS TSESTAALGC LVKDYFPEPV TVSWNSGALT SGVHTFPAVL   180
QSSGLYSLSS VVTVPSSSLG TQTYTCNVDH KPSNTKVDKR VESKYGPPCP PCPAPEFLGG   240
PSVFLFPPKP KDTLMISRTP EVTCVVVDVS QEDPEVQFNW YVDGVEVHNA KTKPREEQYN   300
STYRVVSVLT VLHQDWLNGK EYKCKVSNKG LPSSIEKTIS KAKGQPREPQ VYTLPPSQKE   360
MTKNQVSLTC LVKGFYPSDI AVEWESNGQP ENNYKTTPPV LDSDGSFFLY SKLTVDKSRW   420
QEGNVFSCSV MHEALHNRYT QKSLSLSP                                      448

SEQ ID NO: 2            moltype = AA  length = 444
FEATURE                 Location/Qualifiers
REGION                  1..444
                        note = artificial sequence
source                  1..444
                        mol_type = protein
                        organism = synthetic construct
SEQUENCE: 2
QVQLVQSGSE LKKPGASVKV SCKASGYTFT DNNMDWVRQA PGQGLEWMGD INTRSGGSIY    60
NEEFQDRVIM TVDKSTDTAY MELSSLRSED TATYHCARRK SYGYYLDEWG EGTLVTVSSA   120
STKGPSVFPL APCSRSTSES TAALGCLVKD YFPEPVTVSW NSGALTSGVH TFPAVLQSSG   180
LYSLSSVVTV PSSSLGTQTY TCNVDHKPSN TKVDKRVESK YGPPCPPCPA PEFLGGPSVF   240
LFPPKPKDTL MISRTPEVTC VVVDVSQEDP EVQFNWYVDG VEVHNAKTKP REEQYNSTYR   300
VVSVLTVLHQ DWLNGKEYKC KVSNKGLPSS IEKTISKAKG QPREPQVYTL PPSQEEMTKN   360
QVSLTCLVKG FYPSDIAVEW ESNGQPENNY KTTPPVLDSD GSFFLYSKLT VDKSRWQEGN   420
VFSCSVMHEA LHNHYTQESL SLSP                                          444

SEQ ID NO: 3            moltype = AA  length = 214
FEATURE                 Location/Qualifiers
REGION                  1..214
                        note = artificial sequence
source                  1..214
```

-continued

```
                        mol_type = protein
                        organism = synthetic construct
SEQUENCE: 3
DIQMTQSPSS LSASVGDRVT ITCKASRNIE RQLAWYQQKP GQAPELLIYQ ASRKESGVPD    60
RFSGSRYGTD FTLTISSLQP EDIATYYCQQ YSDPPLTFGG GTKVEIKRTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214

SEQ ID NO: 4           moltype = AA   length = 443
FEATURE                Location/Qualifiers
REGION                 1..443
                       note = An artificially synthesized peptide sequence
source                 1..443
                       mol_type = protein
                       organism = synthetic construct
SEQUENCE: 4
QVQLQESGPG LVKPSETLSL TCAVSGHSIS HDHAWSWVRQ PPGEGLEWIG FISYSGITNY    60
NPSLQGRVTI SRDNSKNTLY LQMNSLRAED TAVYYCARSL ARTTAMDYWG EGTLVTVSSA   120
STKGPSVFPL APSSKSTSGG TAALGCLVKD YFPEPVTVSW NSGALTSGVH TFPAVLQSSG   180
LYSLSSVVTV PSSNFGTQTY TCNVDHKPSN TKVDKTVERK SCVECPPCPA PPVAGPSVFL   240
FPPKPKDTLM ISRTPEVTCV VVDVSQEDPE VQFNWYVDGV EVHNAKTKPR EEQFNSTFRV   300
VSVLTVVHQD WLNGKEYKCK VSNKGLPAPI EKTISKTKGQ PREPQVYTLP PSQEEMTKNQ   360
VSLTCLVKGF YPSDIAVEWE SNGQPENNYK TTPPMLDSDG SFFLYSKLTV DKSRWQEGNV   420
FSCSVMHEAL HAHYTQKSLS LSP                                          443

SEQ ID NO: 5           moltype = AA   length = 214
FEATURE                Location/Qualifiers
REGION                 1..214
                       note = An artificially synthesized peptide sequence
source                 1..214
                       mol_type = protein
                       organism = synthetic construct
SEQUENCE: 5
DIQMTQSPSS LSASVGDSVT ITCQASTDIS SHLNWYQQKP GKAPELLIYY GSHLLSGVPS    60
RFSGSGSGTD FTFTISSLEA EDAATYYCGQ GNRLPYTFGQ GTKVEIERTV AAPSVFIFPP   120
SDEQLKSGTA SVVCLLNNFY PREAKVQWKV DNALQSGNSQ ESVTEQDSKD STYSLSSTLT   180
LSKADYEKHK VYACEVTHQG LSSPVTKSFN RGEC                               214
```